(12) United States Patent
Mathew et al.

(10) Patent No.: US 11,743,191 B1
(45) Date of Patent: Aug. 29, 2023

(54) LOAD BALANCING OVER TUNNEL ENDPOINT GROUPS

(71) Applicant: VMware, Inc., Palo Alto, CA (US)

(72) Inventors: Subin Cyriac Mathew, San Jose, CA (US); Prerit Rodney, Union City, CA (US); Chidambareswaran Raman, Sunnyvale, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/871,996

(22) Filed: Jul. 25, 2022

(51) Int. Cl.
*G06F 15/173* (2006.01)
*H04L 47/125* (2022.01)
*H04L 12/46* (2006.01)

(52) U.S. Cl.
CPC ........ *H04L 47/125* (2013.01); *H04L 12/4633* (2013.01)

(58) Field of Classification Search
None
See application file for complete search history.

(56) References Cited

U.S. PATENT DOCUMENTS

| | | | |
|---|---|---|---|
| 6,888,797 B1 | 5/2005 | Cao et al. | |
| 7,599,373 B1 | 10/2009 | Kalmanek et al. | |
| 9,282,019 B2 | 3/2016 | Ganichev et al. | |
| 9,331,946 B2 | 5/2016 | Okita | |
| 9,912,616 B2 | 3/2018 | Shen et al. | |
| 10,069,646 B2 | 9/2018 | Shen et al. | |
| 10,164,885 B2 | 12/2018 | Shen et al. | |
| 10,719,341 B2 | 7/2020 | Shen et al. | |
| 11,436,037 B2 | 9/2022 | Shen et al. | |
| 2002/0097724 A1 | 7/2002 | Halme et al. | |
| 2005/0207411 A1 | 9/2005 | Ota et al. | |
| 2006/0206655 A1 | 9/2006 | Chappell et al. | |
| 2008/0049752 A1 | 2/2008 | Grant | |
| 2008/0069114 A1 | 3/2008 | Shimada | |
| 2009/0303880 A1 | 12/2009 | Maltz et al. | |
| 2009/0307334 A1 | 12/2009 | Maltz et al. | |
| 2010/0322148 A1 | 12/2010 | Liu et al. | |

(Continued)

FOREIGN PATENT DOCUMENTS

| | | |
|---|---|---|
| CN | 1787490 A | 6/2006 |
| CN | 103457818 A | 12/2013 |

(Continued)

OTHER PUBLICATIONS

Haim, Roie Ben, "Route to Cloud—NSX and Teaming Policy," May 19, 2014, 19 pages, Retrieved from http://www.routetocloud.com/2014/05/nsx-and-teaming-policy/.

(Continued)

*Primary Examiner* — Phyllis A Book
(74) *Attorney, Agent, or Firm* — ADELI LLP

(57) ABSTRACT

Some embodiments provide a method of forwarding data messages between source and destination host computers that execute source and destination machines. At a source computer on which a source machine for a data message flow executes, the method in some embodiments identifies a source tunnel endpoint group (TEPG) associated with the source machine. For the flow, the method selects one TEP of the TEPG as the source TEP. The method then uses the selected source TEP to forward the flow to the destination computer on which the destination machine executes.

19 Claims, 14 Drawing Sheets

(56) References Cited

U.S. PATENT DOCUMENTS

| | | |
|---|---|---|
| 2011/0087799 A1 | 4/2011 | Padhye et al. |
| 2011/0216769 A1 | 9/2011 | Lakshmanan et al. |
| 2011/0225303 A1 | 9/2011 | Engebretson |
| 2011/0299534 A1 | 12/2011 | Koganti et al. |
| 2012/0044837 A1 | 2/2012 | Fernández et al. |
| 2012/0134266 A1 | 5/2012 | Roitshtein et al. |
| 2012/0236761 A1 | 9/2012 | Yang et al. |
| 2013/0058350 A1 | 3/2013 | Fulton |
| 2013/0125124 A1 | 5/2013 | Kempf et al. |
| 2013/0148543 A1 | 6/2013 | Koponen et al. |
| 2013/0318219 A1 | 11/2013 | Kancherla |
| 2013/0322457 A1 | 12/2013 | Budhia et al. |
| 2013/0332602 A1 | 12/2013 | Nakil et al. |
| 2014/0059111 A1 | 2/2014 | Veeraiyan |
| 2014/0086253 A1 | 3/2014 | Yong |
| 2014/0192804 A1 | 7/2014 | Ghanwani et al. |
| 2014/0247753 A1 | 9/2014 | Koponen et al. |
| 2014/0269321 A1 | 9/2014 | Kamble et al. |
| 2014/0269702 A1 | 9/2014 | Moreno et al. |
| 2015/0009995 A1 | 1/2015 | Gross, IV et al. |
| 2015/0010001 A1 | 1/2015 | Duda et al. |
| 2015/0063364 A1 | 3/2015 | Thakkar et al. |
| 2015/0098465 A1 | 4/2015 | Pete et al. |
| 2015/0103673 A1 | 4/2015 | Shimada et al. |
| 2015/0103679 A1 | 4/2015 | Tessmer et al. |
| 2015/0109923 A1 | 4/2015 | Hwang |
| 2015/0117454 A1 | 4/2015 | Koponen et al. |
| 2015/0124821 A1 | 5/2015 | Chu et al. |
| 2015/0124822 A1 | 5/2015 | Chu et al. |
| 2015/0124823 A1* | 5/2015 | Pani ............. H04L 61/5007 370/392 |
| 2015/0124828 A1 | 5/2015 | Cj et al. |
| 2015/0131618 A1 | 5/2015 | Chen |
| 2015/0180769 A1 | 6/2015 | Wang et al. |
| 2015/0253829 A1 | 9/2015 | Palmer et al. |
| 2015/0312144 A1 | 10/2015 | Gobriel et al. |
| 2015/0381484 A1* | 12/2015 | Hira ................. H04L 12/18 370/392 |
| 2016/0011925 A1 | 1/2016 | Kulkarni et al. |
| 2016/0065385 A1 | 3/2016 | Hwang et al. |
| 2016/0134531 A1 | 5/2016 | Assarpour et al. |
| 2016/0218975 A1 | 7/2016 | Hyoudou et al. |
| 2016/0226755 A1 | 8/2016 | Hammam et al. |
| 2016/0234091 A1 | 8/2016 | Emmadi et al. |
| 2016/0241474 A1 | 8/2016 | Wang et al. |
| 2016/0248601 A1 | 8/2016 | Nomi |
| 2016/0278140 A1 | 9/2016 | Sung et al. |
| 2016/0308727 A1 | 10/2016 | Rojas Sánchez et al. |
| 2017/0086191 A1 | 3/2017 | Sipra et al. |
| 2017/0093618 A1 | 3/2017 | Chanda et al. |
| 2017/0163442 A1 | 6/2017 | Shen et al. |
| 2017/0163536 A1 | 6/2017 | Shen et al. |
| 2017/0163598 A1 | 6/2017 | Shen et al. |
| 2017/0163599 A1 | 6/2017 | Shen et al. |
| 2020/0334069 A1 | 10/2020 | Shen et al. |
| 2022/0413893 A1* | 12/2022 | Shen ............. G06F 9/45558 |

FOREIGN PATENT DOCUMENTS

| | | |
|---|---|---|
| CN | 103890751 A | 6/2014 |
| CN | 104272668 A | 1/2015 |
| CN | 104995880 A | 10/2015 |
| EP | 2849395 A1 | 3/2015 |
| WO | 2013026049 A1 | 2/2013 |
| WO | 2015132624 A1 | 9/2015 |
| WO | 2017095564 A1 | 6/2017 |

OTHER PUBLICATIONS

Mahalingham, Mallik, et al., "VXLAN: A Framework for Overlaying Virtualized Layer 2 Networks over Layer 3 Networks," draft-mahalingham-dutt-dcops-vxlan-00.txt Internet Draft, Aug. 26, 2011, 20 pages, Internet Engineering Task Force.

Non-Published Commonly Owned Related U.S. Appl. No. 17/871,991 with similar specification, filed Jul. 25, 2022, 47 pages, VMware, Inc.

Non-Published Commonly Owned Related U.S. Appl. No. 17/871,992 with similar specification, filed Jul. 25, 2022, 46 pages, VMware, Inc.

Non-Published Commonly Owned Related U.S. Appl. No. 17/871,994 with similar specification, filed Jul. 25, 2022, 46 pages, VMware, Inc.

Non-Published Commonly Owned U.S. Appl. No. 17/902,881, filed Sep. 4, 2022, 72 pages, Nicira, Inc.

* cited by examiner

LOAD BALANCING OVER TUNNEL ENDPOINT GROUPS

BACKGROUND

Network virtualization systems make it possible to programmatically create, provision, and manage networks all in software, using the underlying physical network as a simple packet-forwarding backplane. In some such systems, network and security services in software are distributed to hypervisors and attached to individual virtual machines (VMs) in accordance with networking and security policies defined for each connected application.

Network virtualization systems often make use of overlay technologies, which sit above the physical network hardware and work with the server hypervisor layer. Virtual networks use the underlying physical network as a simple packet-forwarding backplane. When VMs communicate with each other, the packet is encapsulated with the IP address information of the destination node. For instance, when VMs communicate with each other in some deployments, the packets are encapsulated with the IP addresses of the source and destination tunnel endpoints (TEPs) that are associated with software switches (called virtual switches) executing on host computers. The physical network delivers the packets to the destination computers, where the outer header is removed, and the packet is delivered by the virtual switch to the destination VM.

With the huge data explosion in software defined datacenters (SDDC), there is increasing demand to support higher network bandwidth between applications. Host computers typically have multiple physical network interface controllers (PNICs) to support higher network bandwidth and provide high availability. Load balancing is commonly used to efficiently utilize the multiple NICs on each host. There are currently two ways to improve the load-balancing of network traffic over the PNICs.

FIG. 1 illustrates the first approach, which is a link aggregation approach in which a TOR (top-of-rack) switch 105 considers the uplink ports of a virtual switch 110 (also called software switch below) as a logical switch port and learns all the MAC (media access control) addresses behind the logical switch port. In this approach, the PNICs of the host computers 100 can be configured to be part of a LAG (link aggregation group) 120, e.g., by using a protocol like LACP (Link Aggregation Control Protocol). The peer ports on the TOR also need to be configured to be part of the LAG. On the hypervisor executing on the host computer, one TEP can be configured, and the encapsulated traffic can transmit or receive from either of the software switch uplinks as the TOR considers them as a single logical port.

This deployment is fraught with issues due to misconfigurations as there are two moving parts (hypervisor side and the TOR side) and as such it is not a recommended topology in many SDDCs. Also, both the ports of the LAG should be connected to the same TOR. This causes issues with redundancy as the TOR becomes single point of failure. Some use other approaches in which the hypervisor PNICs are connected to two different TORs, but the TORs will treat the PNICs as part of a single bundle. Moreover, these other approaches suffer from the same issues of orchestration difficulties due to the need to configure both sides (the server and the switch). Also, as these are pure Layer 2 constructs, they do not handle cases where the customer would like to connect two PNICs/TEPs to two different TORs, each in different L3 domains (IP subnets) for routing redundancy.

FIG. 2 illustrates the second approach. Under this approach, one TEP per uplink port of the virtual switch 110 is configured, and each VNIC port of each workload VM 220 is associated with one of the TEPs. Hence, when there are multiple workload VMs, the overall network traffic across all VMs is load-balanced amongst the TEPs. In the absence of LAG, this model is a reasonable compromise as it load-balances network traffic across all uplinks. The issue, however, is that the load-balancing is at the granularity of the VM VNIC. All network traffic to and from a VM VNIC is tied to one of the TEPs and can only utilize a single uplink of the virtual switch and its associated single PNIC. This can cause issues with throughput for workloads which deal with multiple L3/L4 flows.

BRIEF SUMMARY

Some embodiments provide a method of forwarding data messages between source and destination host computers that execute source and destination machines. At a source computer on which a source machine for a data message flow executes, the method in some embodiments identifies a source tunnel endpoint group (TEPG) associated with the source machine. In some embodiments, a host computer has one or more TEPGs, and one or more tunnel endpoints (TEPs) in each TEPG. For the flow, the method selects one TEP of the TEPG as the source TEP. The method then uses the selected source TEP to forward the flow to the destination computer on which the destination machine executes. In some embodiments, the source host computer has several physical network interface controllers (PNICs) associated with the TEPs of the source TEPG. The TEPs of a host computer in some embodiments are uplink ports of a virtual switch (software switch) executing on the host computer, or are labels associated with the uplink ports.

The method in some embodiments uses the selected source TEP to forward the flow by encapsulating the data messages of the flow with an encapsulating header, and forwarding the encapsulated data messages through a PNIC associated with the selected source TEP. The method in some embodiments stores a first TEP identifier identifying the selected source TEP in the encapsulating header.

In some embodiments, the method also selects a destination TEPG at the destination computer, selects a destination TEP in the destination TEPG, and then stores a second TEP identifier identifying the destination TEP in the encapsulating header. In some embodiments, the first and second TEP identifiers are network addresses associated with the selected source and destination TEPs. In other embodiments, the first and second TEP identifiers are not L2, L3 or L4 addresses associated with the selected source and destination TEPs, but rather are other types of identifiers (e.g., alphanumeric identifiers or labels).

At a first host computer that executes a first machine, the method of some embodiments receives an encapsulated first data message of a first flow from a second machine executing on a second host computer. The encapsulating header of the first data message stores identifiers of a first TEP pair. Specifically, this header stores a first identifier of a first TEP of a first TEPG of the first computer, and a second identifier of a second TEP of a second TEPG of the second computer. The first TEP is the destination TEP for the first flow, while the second TEP is the source TEP for the first flow.

The method decapsulates the first data message and provides the first data message to the first machine. The method also selects, for a second data message of a second flow from the first machine to the second machine, a different second TEP pair. This pair includes a third TEP of the first computer and a fourth TEP of the second computer. The second TEP pair is different than the first TEP pair in that the third TEP is different from the first TEP, the fourth TEP is different from the second TEP, or both the third and fourth TEPs are different from the first and second TEPs.

In some embodiments, the second flow from the first machines to the second machine is in response to the first flow from the second machine to the first machine. In other embodiments, the second flow is not in response to the first flow. In some embodiments, the first machine sends a third flow to the second machine in response to the first flow. For this third flow, the method selects the same first TEP pair that was used for the first flow. Specifically, it will use the first TEP as the source TEP for the third flow, and the second TEP as the destination TEP for the third flow. The method of some embodiments creates, after receiving the first flow, a connection-tracking record that stores the first and second TEPs, and then uses the connection-tracking record to select the first and second TEPs for the third data message flow.

The method of some embodiments configures each host computer to send to a cluster of one or more controllers, an identifier for a TEPG that is used on the host computer for a segment of a logical network that is implemented by the host computer. This TEPG includes one or more TEPs in some embodiment. Along with this TEPG identifier, the method sends one or more MAC addresses of machines that are associated with the TEPG.

The controller cluster then distributes the received TEPG identifier and the set of MAC addresses to other host computers executing at least one machine associated with the logical network or the segment of the logical network. Each host computer can use the TEPG identifiers and associated sets of MAC addresses that it receives from the controller cluster to identify the TEPGs to use when sending data messages to the machines with the associated MAC addresses. In some embodiments, each time a host computer powers up, the host computer publishes to the controller cluster the identifier of each TEPG defined on the host computer along with the identifiers of the one or more TEPs of each TEPG. The published identifiers of each TEP are the MAC address and IP address of the TEP in some embodiments.

Also, each time a machine is associated with a TEPG on a host computer (e.g., the machine is associated with a segment of a logical network implemented by a software forwarding element (e.g., virtual switch) executing on the host computer), the host computer in some embodiments publishes to the controller cluster the identifier of the TEPG along with the MAC address of the machine. The controller cluster distributes any published information that it receives from one host computer to other host computers. For instance, after receiving the MAC address to TEPG mapping of a first machine executing on a first host computer and associated with a segment of a logical network, the controller cluster distributed the published information to other host computers that execute software forwarding elements (e.g., software switches and/or routers) that are connected to the same segment. When a machine on one of these other host computers is sending a flow to another machine on the host computer that published the TEPG group and its TEPs to the controller cluster, the other host computer can use the TEPG information distributed by the controller to identify the TEPG that is associated with the other machine.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description, and Drawings.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a novel way of utilizing tunnel endpoint (TEPs) to establish tunnels that are used to define overlay logical networks over a shared physical network. The overlay logical networks connect source and destination machines (e.g., VMs, Pods, containers) that execute on devices (e.g., computers) on which the TEPs are defined. These embodiments define one or more TEP groups (TEPGs) on each device, with each TEPG having one or more TEPs as members.

In some embodiments, the TEPs and TEPGs are associated with virtual switches executing on the devices. Some embodiments use novel virtual switch teaming policy when TEPGs are configured. This novel teaming policy provides many different load-balancing options across the TEPs of a TEPG. A few examples of such teaming policies for TEPG in some embodiments include (1) source and destination IP address, (2) destination IP address and TCP/UDP Port, (3) source IP address and TCP/UDP Port, and (4) source and destination IP address and TCP/UDP Port. Many other teaming policies are used in some embodiments. In some embodiments, one or more administrators define the teaming policy for each TEPG when they manually create each TEPG, and/or when defining the configuration file for automatically defining TEPGs on host computers.

Figure 1:
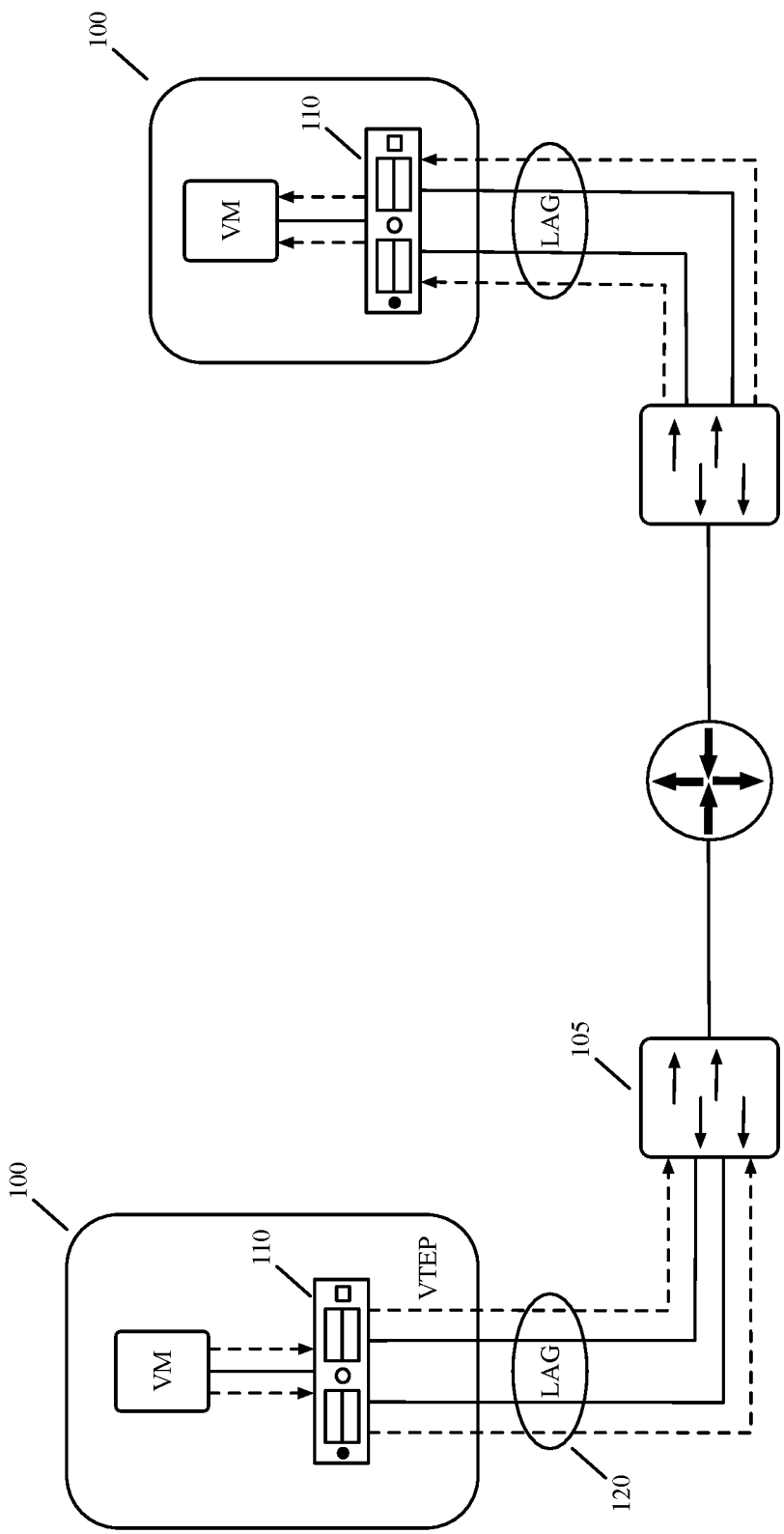
FIG. 1 conceptually illustrates a link aggregation approach in which a TOR (top-of-rack) switch considers the uplink ports of a virtual switch as a logical switch port and learns all the MACs behind the logical switch port.
Figure 2:
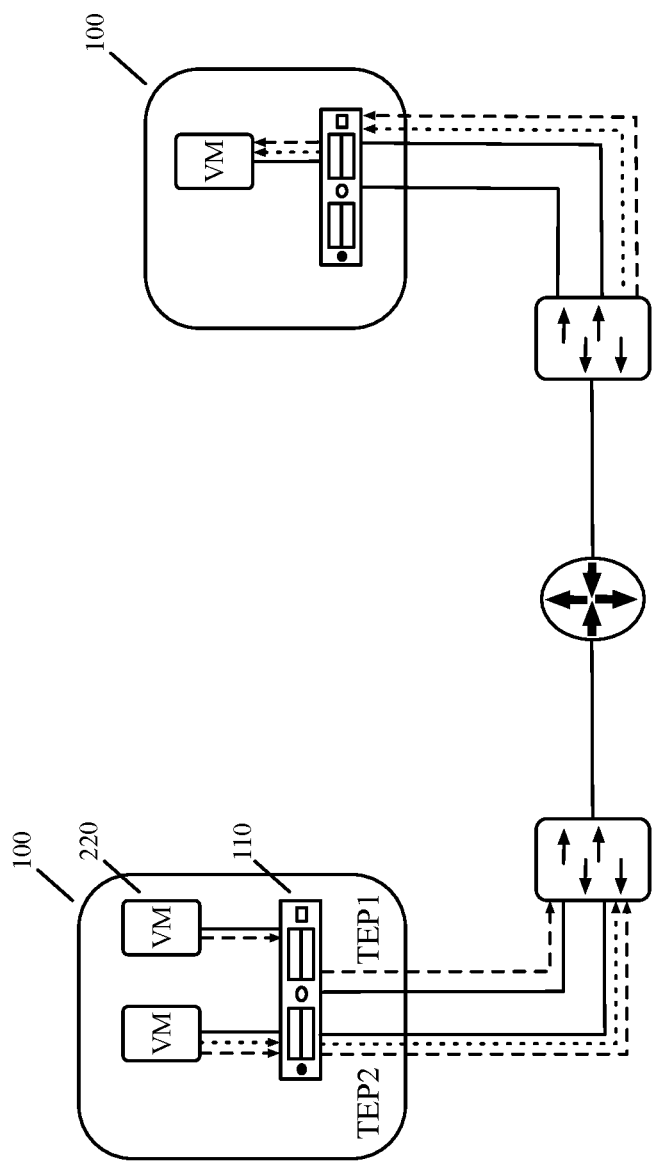
FIG. 2 conceptually illustrates an approach in which one TEP per uplink port of the virtual switch is configured, and each VNIC port of each workload VM is associated with one of the TEPs.
Figure 3:
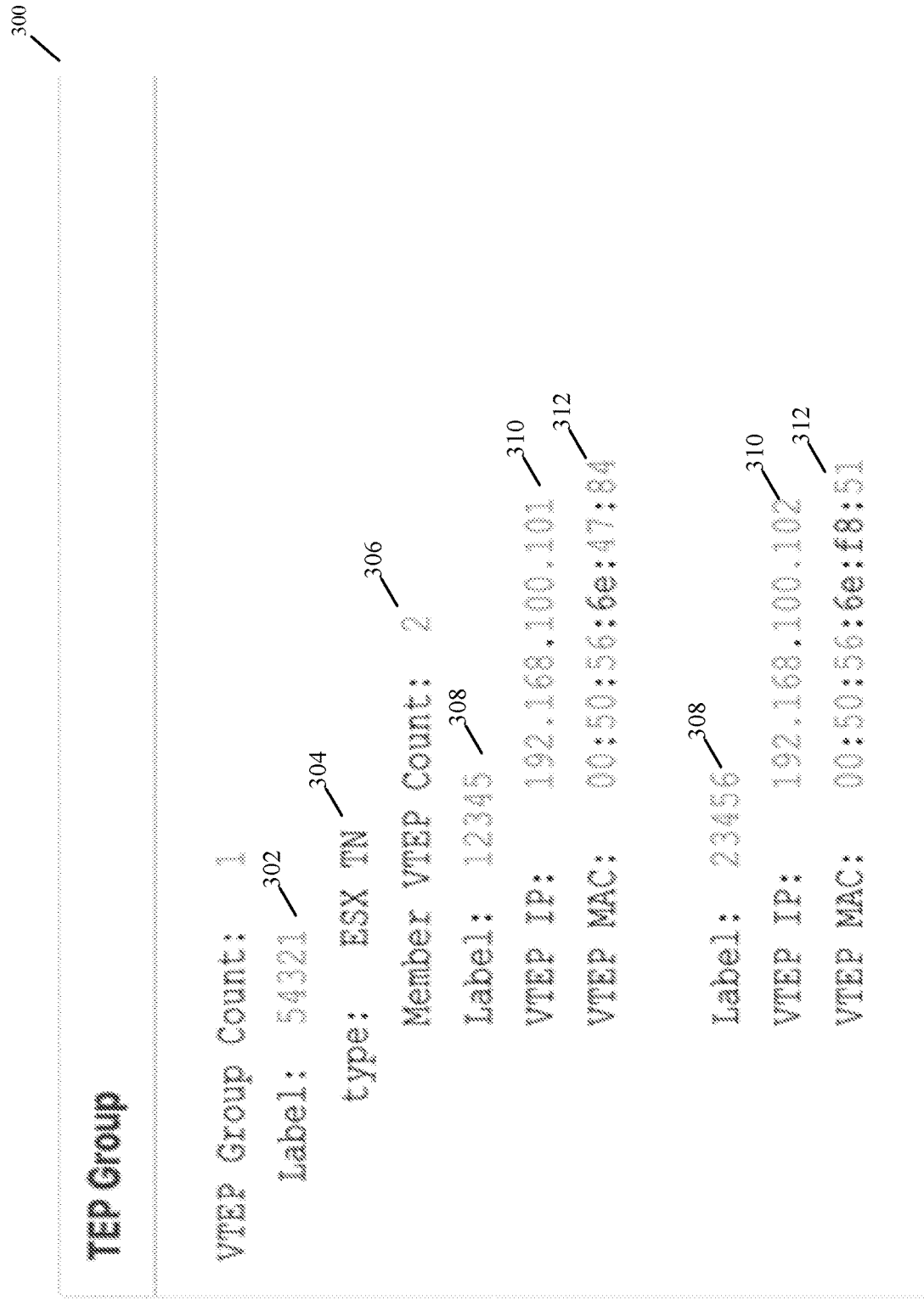
FIG. 3 conceptually illustrates an example of how a TEPG is defined in some embodiments.

FIG. 3 illustrates an example of how a TEPG 300 is defined in some embodiments. As shown, the TEPG 300 is identified by a label 302 that serves as the TEPG identifier. Next, it has a type attribute 304 that specifies its type, which in this example is an ESX transport node TEPG, with ESX being the name of the hypervisor from VMware, Inc. that is used on a host computer on which the TEPG is defined. The TEPG 300 also has a member number identifier 306 that specifies the number of TEPs that are members of the TEPG. In this example, the TEPG has two members. Each member TEP's attributes are also specified. As shown, each member TEP is specified in terms of its label (i.e., its identifier) 308, its IP address 310 and its MAC address 312.

In some embodiments, each TEP's IP and MAC address are defined in the underlay network (e.g., physical network) over which the overlay logical networks are defined. As such, the TEP IP and MAC addresses are addresses in the physical network, while the addresses of the workload machines (e.g., VMs, Pods, containers, etc.) connected by the logical networks are addresses in the logical overlay address space. Other embodiments use other addressing schemes, e.g., define the MAC address of the workload machines in the physical address space.

When the SDDC host computers implement multiple logical networks, each logical network can have a segregated address space from other logical networks, or common address space that overlaps with the address space of one or more other logical networks. Such overlapping address spaces are acceptable in some embodiments as these addresses are not exposed to the shared underlay physical network, but rather are only used by the components of the logical networks (e.g., source and destination workload machines that process these addresses after the underlay addresses have been stripped out).

In some embodiments, the TEPs are tunnel endpoints in the physical network for the tunnels that are used to define the overlay logical networks. For instance, in some embodiments, the workload machines send data messages to each other with headers that have source and destination L2, L3 and L4 addresses that are defined in an addresses space of a logical overlay network. At the forwarding elements that are configured to implement the logical overlay network (e.g., at virtual switches executing on host computers with the workload machines), the data messages are then encapsulated with encapsulation headers that store the physical network (L2, L3 and L4) addresses of the source and destination TEPs, e.g., the TEP defined on the source and destination host computers on which the source and destination workload machines execute.

These headers allow the data messages exchanged by the machines that are part of the logical overlay network to travel through the underlay network to reach their destinations (e.g., the host computers on which the destination machines are executing). In some embodiments, a tunnel is established (e.g., with keep-alive signaling) between the source and destination TEPs, and the encapsulated data message is sent through this tunnel. In other embodiments, no tunnel is actively maintained (e.g., with keep-alive signaling) between the source and destination TEPs, but the network addresses of these TEPs are used in encapsulation headers to allow the encapsulated data message to traverse the underlay network between source and destination TEPs.

As used in this document, data messages refer to a collection of bits in a particular format sent across a network. One of ordinary skill in the art will recognize that the term data message may be used herein to refer to various formatted collections of bits that may be sent across a network, such as Ethernet frames, IP packets, TCP segments, UDP datagrams, etc. Also, as used in this document, references to L2, L3, L4, and L7 layers (or layer 2, layer 3, layer 4, layer 7) are references respectively to the second data link layer, the third network layer, the fourth transport layer, and the seventh application layer of the OSI (Open System Interconnection) layer model.

Figure 4:
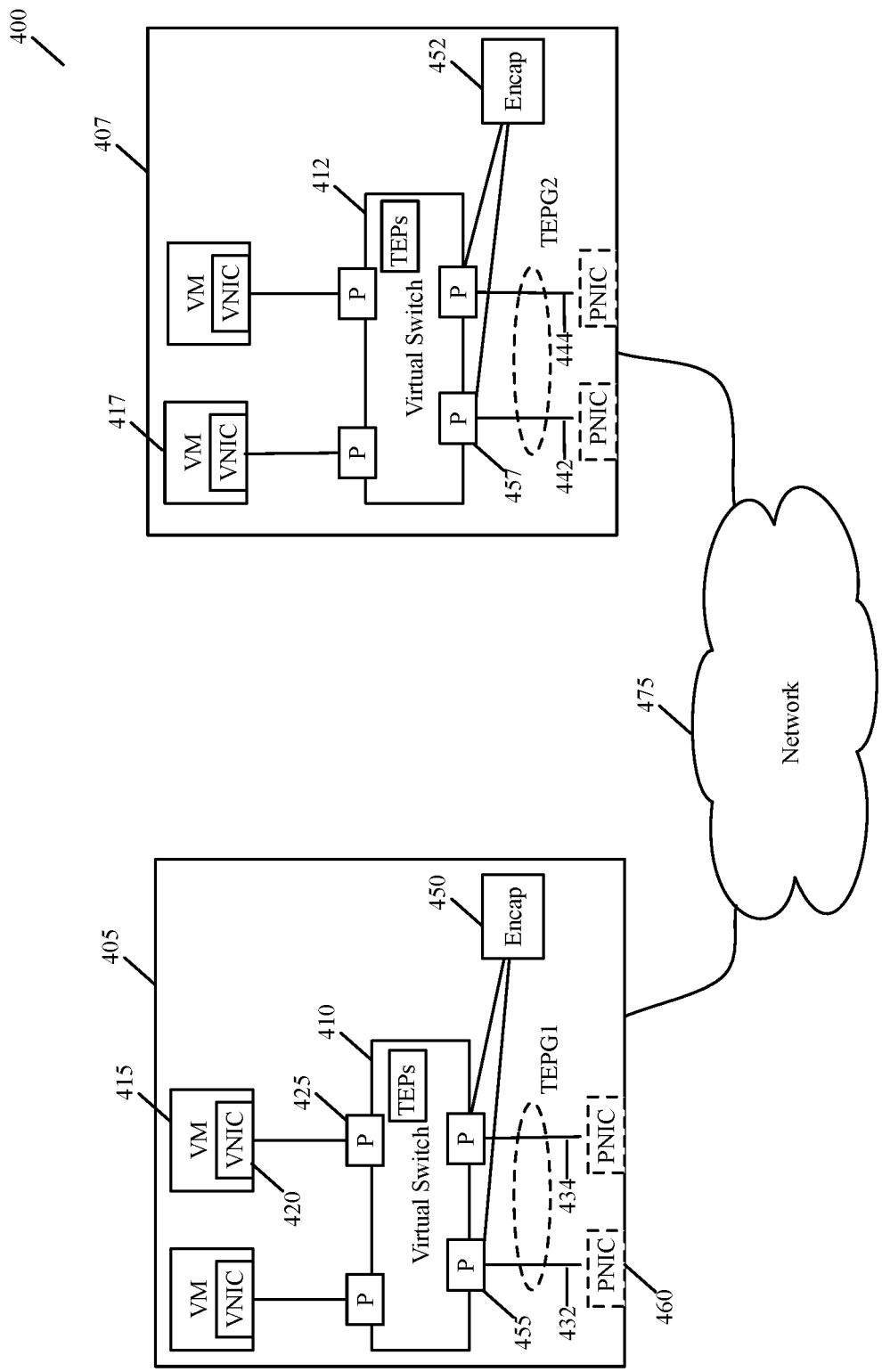
FIG. 4 conceptually illustrates an example of a Software Defined Datacenter (SDDC) that uses TEPGs as load-balanced groups of TEPs that are used as termination interfaces in a shared underlaying physical network over which logical networks are defined.

FIG. 4 illustrates an example of a Software Defined Datacenter (SDDC) 400 that uses TEPGs as load-balanced groups of TEPs that are used as termination interfaces in a shared underlaying physical network over which logical networks are defined. As further described below, the TEPGs in this example are groups of virtual-switch uplinks ports, which serve as TEPs for terminating tunnels used for forwarding overlay network data messages.

In this example, two host computers 405 and 407 are shown. Multiple VMs (including VMs 415 and 417) execute on each host computer along with a software switch (e.g., software switches 410 and 412), also called a virtual switch. One or more applications execute on each VM, and these applications can be sources or destinations of data message flows between the VMs. In some embodiments, the VMs operate over a hypervisor (not shown) executing on each host computer, and each software switch 410 or 412 is a component of the hypervisor.

Each VM of host computer 405 has a virtual NIC (VNIC) 420 that is associated with a port 425 (e.g., an interface) of the virtual switch 410. In some embodiments, each virtual switch 410 or 412 has one uplink port 455 for each PNIC 460 of its host computer 405 or 407, and these uplink ports serve as TEPs for terminating tunnels used for forwarding overlay network data messages. The TEPGs in this example are groups of the virtual-switch uplinks ports 455. Each VM (e.g., each VM's VNIC 420 or VM's associated switch port 425) is associated with a TEPG.

For the VMs 415 to exchange data messages through the logical network, an encapsulator 450 encapsulates the data messages on the source host computer 405 with the IP addresses of the source and destination TEPs. The encapsulator 450 in some embodiments is an encapsulation service offered by the hypervisor that executes on each host computer. As shown, the encapsulator 450 in some embodiments is a service called by an uplink port 455 of the virtual switch. The encapsulator 450 is also referred to below as an overlay process, overlay module or overlay service as it performs encapsulation and decapsulation operations necessary for allowing overlay data messages of one or more logical networks to traverse the shared underlay physical network 475.

The physical network 475 delivers each encapsulated data message to its respective destination computer, e.g., computer 405 or 407. The encapsulator 450 or 452 on that computer removes the outer header and passes the data message to its host computer's virtual switch (e.g., 410 or 412), which then delivers the data message to the destination VM executing on that host computer. In some embodiments, the physical network includes switches, routers and/or other forwarding elements, as well as wired and/or wireless connections between them.

In some embodiments, the virtual switch 410 or 412 on each host computer selects a TEPG and a TEP within the selected TEPG for each data message flow that is sent from a source workload VM executing on its host computer. For instance, when a data message flow from the VM 415 reaches the virtual switch 410 executing on the host computer 405, the virtual switch in some embodiments identifies the TEPG associated with the VM 415, and then performs a load-balancing operation to select a TEP within the TEPG for the flow. In this load balancing operation in some embodiments, the virtual switch performs a hash computation on the parameters specified by the teaming policy defined for the source TEPG, and then based on the computed hash value selects an uplink port of the virtual switch. As mentioned above, each uplink port of the virtual switch is associated with just one PNIC of its host computer.

In some of these embodiments, the virtual switch uses a hash table with multiple hash ranges, with each range associated with an uplink port that serves as a TEP. In these embodiments, the virtual switch identifies the hash range that contains a computed hash value for a flow, and then selects the uplink port of the identified hash range for the flow. In other embodiments, the virtual switch selects an uplink port (i.e., a TEP) for a flow by performing a modulo operation, such as uplink=hash (source IP, dest IP, source port, dest port, protocol) modulo<number of members of the TEP-Group>

Load balancing across the different TEPs of a TEP group for the different flows allows a virtual switch (e.g., virtual switch 410) to send different flows of a VM (e.g., VM 415) through different uplink ports of the virtual switch (and hence different PNICs of the host computer) in a load balanced manner. When the MAC address of a VM is learnt behind a TEP group, the virtual switch in some embodiments performs a similar hash-based load balancing operation to choose the destination TEP for receiving the flow in the destination TEPG of the destination device (e.g., the computer on which the destination machine executes), as further described below. As further described below, the MAC address learning in some embodiments can be either through control plane publications of MAC addresses behind TEPGs or through data plane learning of the encapsulators.

As mentioned above, the encapsulator 450 encapsulates the data messages of each flow with an encapsulating header (e.g., a GENEVE header) that stores the source and destination network addresses (e.g., L2-L4 addresses) of the selected TEP as the source TEP for the flow. Each encapsulating header in some embodiments is placed outside of the original header of the data message (i.e., encapsulates the original header without any modification to the original header). In some embodiments, the encapsulating header also includes the identifier (e.g., the label 308 of FIG. 3) of the selected source and destination TEPs for the flow. Alternatively, or conjunctively, the encapsulating header includes the identifier (e.g., the label 302 of FIG. 3) of the source and destination TEPGs for the flow.

The encapsulating header of the data message (more specifically, the network addresses of the source and destination TEPs used in the encapsulation header) allows the data message that is part of the logical overlay network to travel through the underlay network to reach its destinations (e.g., the destination host computers on which the destination machine is executing). In some embodiments, this data message is sent through a tunnel that is established (e.g., with keep-alive signaling) between the source and destination TEPs. In other embodiments, no tunnel is actively maintained between the source and destination TEPs, but the network addresses of these TEPs are used in encapsulation headers to allow the encapsulated data message to traverse between source and destination TEPs.

When the data message reaches the destination host computer (e.g., computer 407), a PNIC on that host computer passes the data message to an uplink port 457 of the virtual switch (e.g., switch 412) on that host computer. The uplink port 457 then calls the overlay process (e.g., encapsulator 452) on that host computer, which then learns the source VM's MAC address (e.g., the MAC address of VM 415) behind the source TEPG identified in the encapsulating header (e.g., the GENEVE header).

This learning is different than the prior art learning, in which the source VM's MAC address behind the source TEP associated with this VM is learned, as opposed to the source TEPG associated with this VM. This learning is part of the data plane learning of the TEPG, which supplements the control plane publication of the TEPGs as further described below. For a responsive flow in the reverse direction, the virtual switch uses the learned MAC address behind a TEPG to select the TEPG for the destination, and then selects a destination TEP within the selected TEPG, as further described below. In the reverse direction, the virtual switch (e.g., virtual switch 412) in some embodiments performs a similar hashing to what was described above, in order to load balance the return traffic over the TEPs of the selected destination TEPG.

Figure 5:
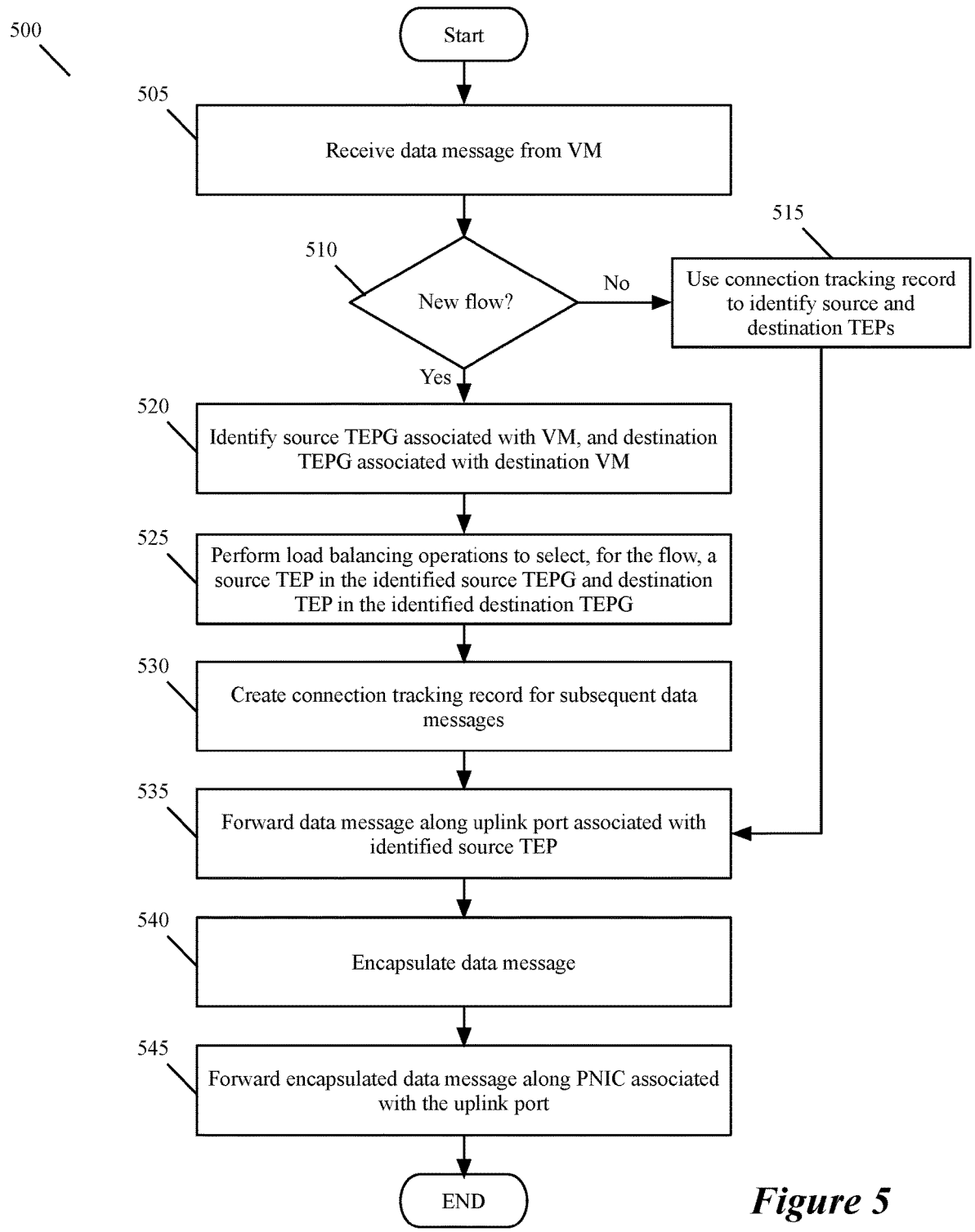
FIG. 5 conceptually illustrates a process that is performed in some embodiments on a host computer to identify source and destination TEPGs for a data message flow, to select source and destination TEPs within the identified TEPGs, and to use the identified TEPs to forward encapsulated data messages for a logical network that traverse a shared underlay network (e.g., a shared physical underlay network).

FIG. 5 illustrates a process 500 that is performed in some embodiments on a host computer to identify source and destination TEPGs for a data message flow, to select source and destination TEPs within the identified TEPGs, and to use the identified TEPs to forward encapsulated data messages for a logical network that traverse a shared underlay network (e.g., a shared physical underlay network). In some embodiments, the components of a hypervisor that execute on a host computer 405 perform the operations of the process 500.

As shown, the process 500 starts when a data message of a data message flow is received (at 505) at a port of a virtual switch (e.g., switch 410) from a VNIC of a VM (e.g., VM 415) (1) that is the source of the data message flow, and (2) that executes on the same host computer (e.g., computer 405) as the virtual switch. Next, at 510, the virtual switch determines whether the received data message is the first data message of a new flow. If not, the virtual switch uses (at 515) a connection tracking record that it previously created for the flow (at 530 as further described below) to identify the source TEP and the destination TEP for the flow, and then transition 535, which will be described below.

On the other hand, when the received data message is the first data message for a new flow, the process transitions from 510 to 520, where the virtual switch identifies source and destination TEPGs for the flow. In some embodiments, the virtual switch identifies the source TEPG by identifying the TEPG that was previously specified for the source VM, the source VM's VNIC or the virtual switch port associated with this VM or its VNIC. The virtual switch identifies the destination TEPG by looking up its records that identify the different TEPG for the different VM MAC addresses.

For the virtual switch to identify this destination TEPG, the virtual switch or its associated encapsulator in some embodiments needs to first learn the TEPG associated with the MAC address of the destination machine (i.e., associated with the destination MAC address of the received flow). As mentioned above, and further described below, this learning in some embodiments can be through the control plane publication of MAC addresses behind TEPGs or through the overlay processes (e.g., the encapsulators 450 or 452) data plane learning of the MAC addresses upon receiving encapsulated data messages sent to their host computers respective TEPs.

After identifying the source and destination TEPGs, the virtual switch then performs (at 525) two load balancing operations, with the first selecting a source TEP within the source TEPG and the second selecting the destination TEP with the destination TEPG. As mentioned above, the first load balancing operation of the virtual switch in some embodiments computes a hash value from the parameters specified by the teaming policy defined for the source TEPG, and then based on the computed hash value selects an uplink port of the virtual switch (e.g., identifies a hash range in a hash table that is associated with the computed hash value, and then selects the TEP that is associated in the hash table with the identified hash range). Examples of parameters that can be specified by the teaming policies in some embodiments include (1) source and destination IP address, (2) destination IP address and TCP/UDP Port, (3) source IP address and TCP/UDP Port, (4) source and destination IP address and TCP/UDP Port, etc.

In other embodiments, the virtual switch selects its source TEP for a flow by performing a modulo operation on the hash value computed from the parameters specified by the teaming policy defined for the destination TEPG. An example of such a modulo operation is > TEP #=hash (source IP, dest IP, source port, dest port, protocol) modulo<number of members of the TEP-Group>

The virtual switch in these embodiments then identifies the uplink port associated with the identified source TEP, as further described below. Instead of identifying the source TEP, the virtual switch in some embodiments simply identifies its uplink port that is associated with a source TEP of the identified source TEPG, as described above. Load balancing of the different flows across the different source TEPs of a source TEPG on the source VM's host computer allows the virtual switch on the host computer to send one VM's flows in a load balanced manner through different uplink ports of the virtual switch, and hence through different PNICs, of the host computer.

In some embodiments, the second load balancing operation of the virtual switch selects for a flow a destination TEP in the identified destination TEPG in a similar manner to the way it selects the source TEP for the flow in the identified source TEPG. For instance, in some embodiments, the virtual switch computes a hash value from the parameters specified by the teaming policy defined for the destination TEPG, and then based on the computed hash value selects an uplink port of the destination virtual switch (e.g., identifies a hash range in a hash table that is associated with the computed hash value, then selects the destination TEP that is associated in the hash table with the identified hash range).

Alternatively, in other embodiments, the virtual switch selects the destination TEP for a flow by performing a modulo operation on the hash value computed from the parameters specified by the teaming policy defined for the destination TEPG. Again, examples of parameters that can be specified by the teaming policies in some embodiments include (1) source and destination IP address, (2) destination IP address and TCP/UDP Port, (3) source IP address and TCP/UDP Port, (4) source and destination IP address and TCP/UDP Port, etc. Load balancing for the different flows across the different destination TEPs of a destination TEP group allows the virtual switch of one host computer to send a first VM's flows to a second VM executing on a second host computer in a load balanced manner through the different uplink ports of the virtual switch of the second host computer, and hence through different PNICs, of the second host computer.

In the example illustrated in FIG. 4, the virtual switch 410 might select the source and destination TEPs to be TEPs 432 and 444 for a first flow from the VM 415 to the VM 417, select source and destination TEPs to be TEPs 432 and 442 for a second flow from the VM 415 to the VM 417, and then select source and destination TEPs to be TEPs 434 and 442 for a third flow from the VM 415 to the VM 417.

After selecting source and destination TEPs for the received data message's flow, the virtual switch creates (at 530) a connection tracking record that associates the identifier of the flow (e.g., the flow's five tuple identifier) with the source and destination TEPs selected for the flow at 525. For subsequent data message of the same flow, the virtual switch can then use this connection tracking record to identify (at 515) the selected source and destination TEPs for these data messages.

At 535, the virtual switch then directs its uplink port that is the selected source TEP to forward the data message. The uplink port has one or more callback hooks defined for it, with each callback hook being a call to a module of the hypervisor to perform a service. One of these hooks is the encapsulator (e.g., encapsulator 450) of the host computer of the virtual switch. This encapsulator encapsulates (at 540) the data messages with an encapsulating header (e.g., a GENEVE header) that stores the source and destination network addresses (e.g., L2-L4 addresses) of the selected source and destination TEPs. In some embodiments, the encapsulating header also includes the identifier (e.g., the label 308 of FIG. 3) of the selected source and destination TEPs for the flow and/or the identifier (e.g., the label 302 of FIG. 3) of the source and destination TEPGs for the flow.

After the data message is encapsulated, the uplink port (that was the selected source TEP for the data message) provides (at 545) the encapsulated data message to its associated PNIC, which then passes it to the destination host computer associated with the destination TEP through the underlay physical network. The encapsulating header of this data message allows the data message to traverse the underlay physical network to reach its destination (e.g., the destination host computer on which the destination VM for the flow resides) as it contains the source and destination TEP network addresses, which are defined in the underlay physical network address space. After 545, the process ends.

For a first flow from a first source host computer to a destination second host computer, the destination second host computer in some embodiments performs the process 500 to send a second flow from the second computer to the first computer that is in response to the first flow. In other words, in these embodiments, the second host computer selects for the second flow source and destination TEPs in source and destination TEPGs independently of the source and destination TEPs that the first host computer selected for the first flow. The second flow is responsive to the first flow when it uses the same source and destination L3 and L4 addresses, albeit with the source and destination designations reversed.

Figure 6:
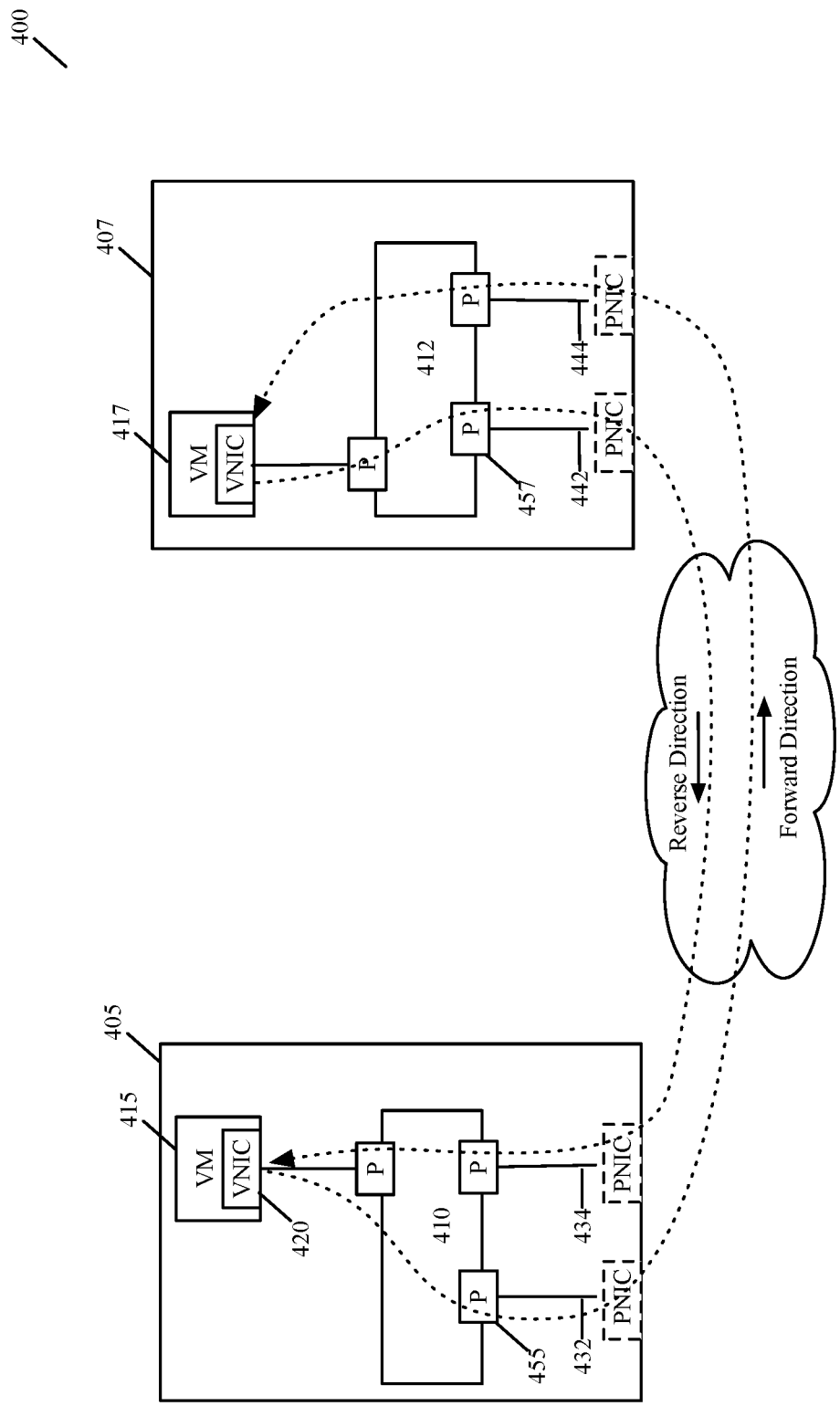
FIG. 6 conceptually illustrates an example of this independent selection of the TEPs for a responsive flow.

FIG. 6 illustrates an example of this independent selection of the TEPs for a responsive flow. Specifically, it illustrates the virtual switch 410 selecting source and destination TEPs 432 and 444 for a first flow from the VM 415 executing on the host computer 405 to VM 417 executing on the host computer 407. It then shows virtual switch 417 on the host computer 407 selecting a different pair of TEPs 442 and 434 for a second flow that the VM 417 sends to the VM 415 in response to the first flow.

Even though the source and destination TEPs have no overlap in the forward and reverse directions, the source and destination TEPs might have an overlap (e.g., TEP 432 might be used as the source TEP in the forward direction, and the destination TEP in the reverse direction). It is even possible for the same exact pair of TEPs to be used in the forward and reverse directions under this approach, so long as the destination virtual switch for the forward flow makes its TEP selection for the reverse flow independently of the selection made for the forward flow.

In other embodiments, the second computer selects for a second flow that is responsive to a first flow from a first host computer that must necessarily use the same source and destination TEPs in the source and destination TEPGs as the first host computer, except that the second computer's source TEP was the first computer's destination TEP and its destination TEP was the first computer's source TEP. To select the same pair of TEPs, the destination second computer creates a connection tracking record to specify the source and destination TEPs (for the first or second flow) when it receives the first flow (e.g., the first data message of the first flow), and then it uses this record when processing the data messages of the second flow to identify the source and destination TEPs for the second flow.

Figure 7:
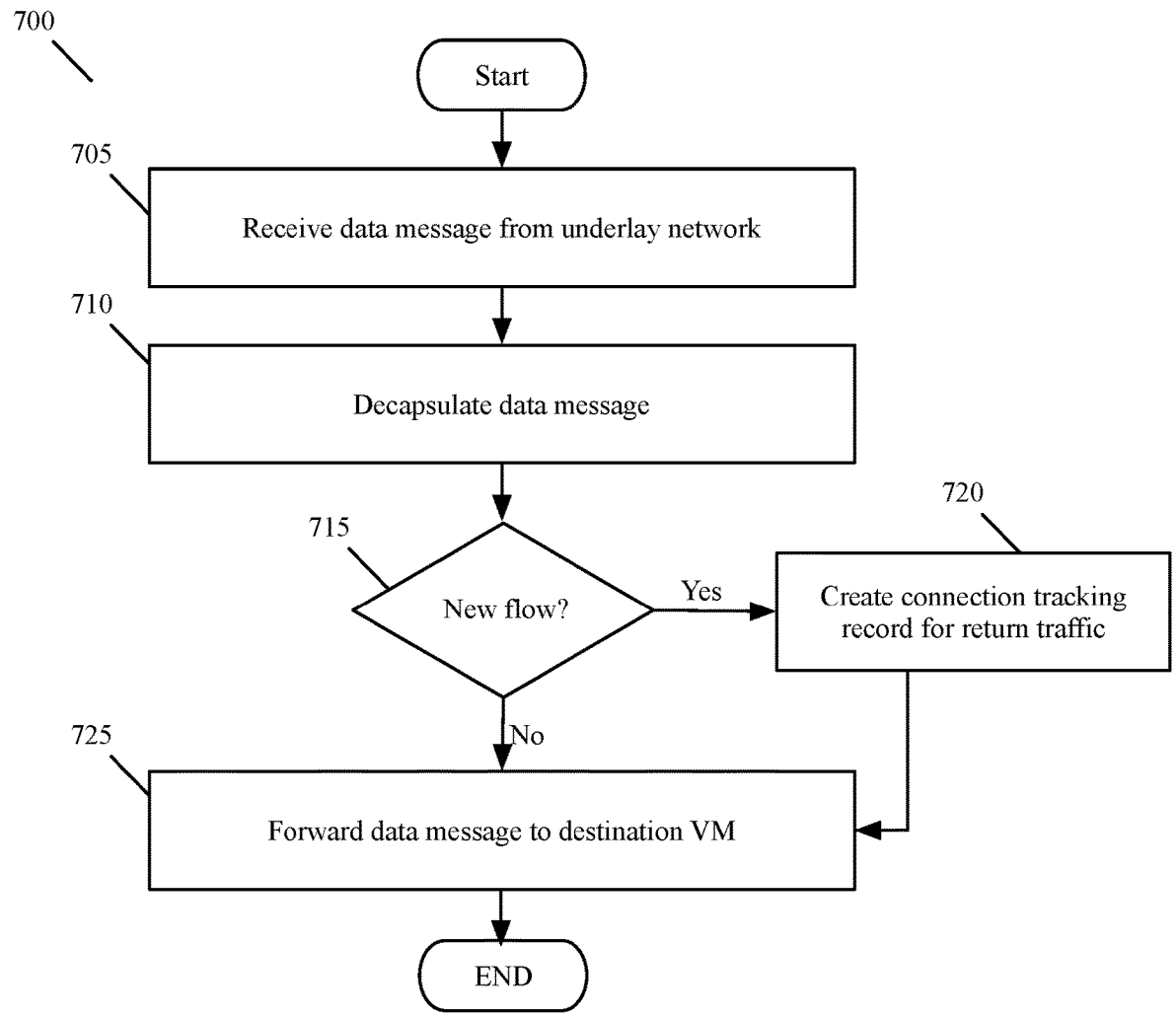
FIG. 7 conceptually illustrates a process that is performed by a second computer to select the same pair of TEPs for a second flow from the second computer to the first computer that is responsive to a first flow from the first host computer to the second computer.

FIG. 7 illustrates a process 700 that is performed by a second computer to select the same pair of TEPs for a second flow from the second computer to the first computer that is responsive to a first flow from the first host computer to the second computer. This process creates a connection tracking record at the second computer after receiving the first flow from the source first computer. The process 700 is performed by the encapsulator and the virtual switch at the second computer.

As shown, the process starts (at 705) when an uplink port (e.g., port 457 of the virtual switch 412) receives an encapsulated data message. The uplink port is the destination TEP to which the encapsulated data message is sent. As mentioned above, a tunnel is established between the source and destination TEPs in some embodiments. In these embodiments, the encapsulated data message is sent through the tunnel that is established between the source and destination TEPs through which the data message is sent from the source computer and received at the destination computer.

In some embodiments, the uplink port then has its associated overlay process (e.g., encapsulator 452) decapsulate (at 710) the data message, and extract the source and destination TEPs and source and destination TEPGs. When the flow is a first flow from a source TEPG or from a new source VM behind the previously identified source TEPG, the overlay process (at 710) learns the source MAC address behind the source TEPG and creates a record to reflect this learning, as further described below.

Figure 8:
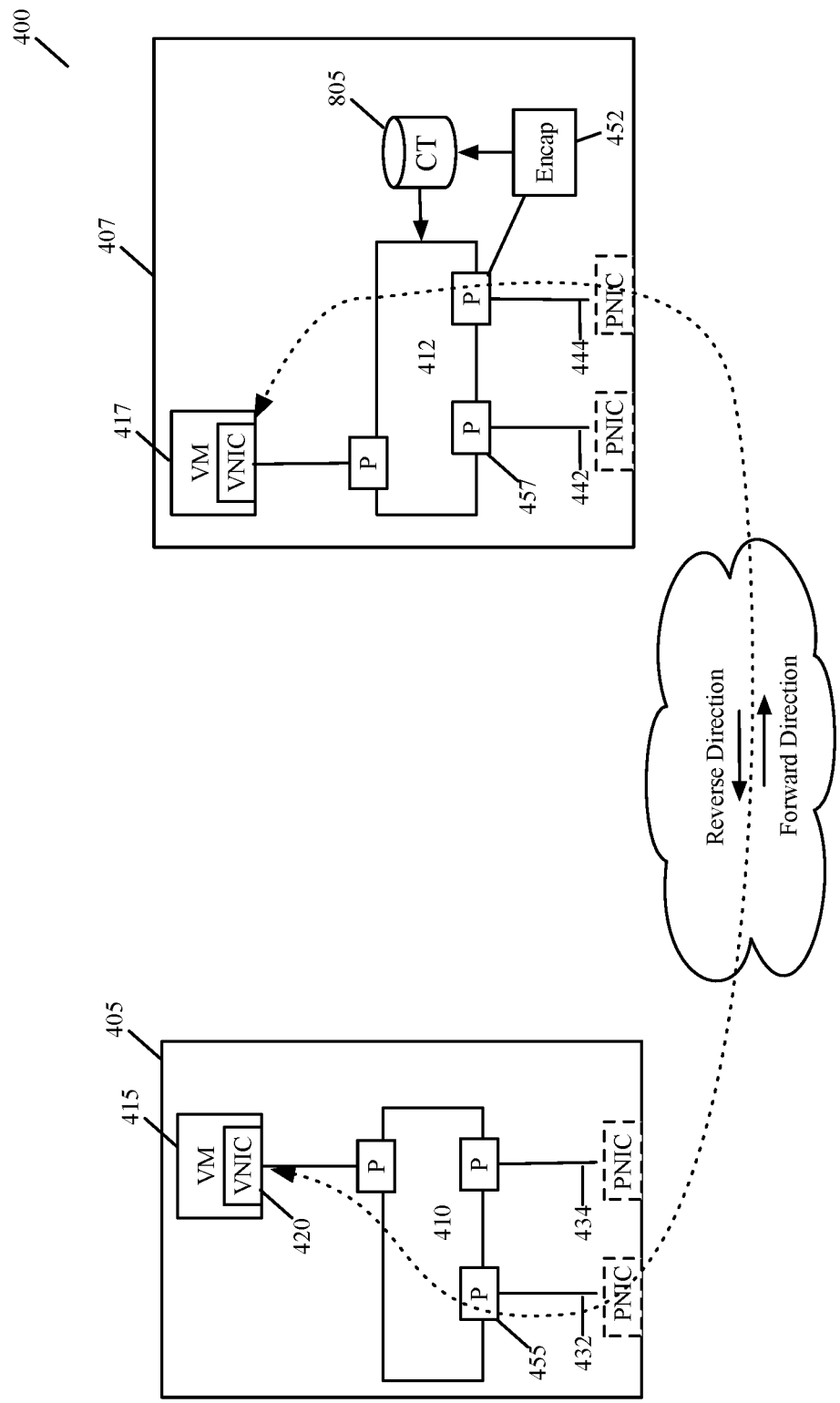
FIG. 8 conceptually illustrates an example of the encapsulator of FIG. 4 creating a record in a connection storage for a first flow from the VM on the first host computer to the VM on the second host computer.

Next, at 715, the encapsulator determines whether the data message is the first data message of a new flow. If so, the encapsulator creates (at 720) a connection tracking record that stores the source and destination TEPs for the reverse flow that a VM on its host computer (i.e., the destination VM of the received data message) might send to the VM that was the source of the received data message. FIG. 8 illustrates an example of the encapsulator 452 creating a record in a connection storage 805 for a first flow from the VM 415 on the first host computer 405 to the VM 417 on the second host computer 407.

In some embodiments, the created connection tracking record associates the flow identifier of the possible reverse flow with a pair of source and destination TEPs, with (1) the source TEP in the pair being the destination TEP of the data message received at 705 and (2) the destination TEP being the source TEP of the data message received at 705. From 720, the process transitions to 725.

The process 700 also transitions to 725 when it determines (at 715) that the data message is not the first data message of a new flow. At 725, the encapsulator passes the received data message back to the uplink port, which passes it to its virtual switch to forward the decapsulated, received data message to the destination VM along the virtual-switch port that is associated with the destination VM's VNIC. After 725, the process 700 then ends.

After the process 700 ends for a first data message of a first flow to a VM connected to a virtual switch, the virtual switch might receive from its VM a second data message that is responsive to the first data message or to the flow of the first data message. For such a responsive data message, the virtual switch uses the created connection-tracking record to select the source and destination TEPs. FIG. 8 illustrates an example of this. Specifically, it shows the virtual switch 412 selecting the same TEP pairs 444 and 432 for the responsive flow, albeit this time with the TEP 444 being the source TEP and the TEP 432 being the destination TEP. The virtual switch then passes the data message to its uplink port, which then has its encapsulator preparing the encapsulation header for this data message.

This encapsulation header specifies the source and destination network addresses of the selected source and destination TEP as the source and destination network addresses in the encapsulating header. In some embodiments, the encapsulating header also stores the source and destination TEP identifiers and/or source and destination TEPG identifiers. The encapsulator then passes the encapsulated data message to the uplink port, which then passes its associated PNIC for forwarding to the destination computer through the intervening network.

Figure 9:
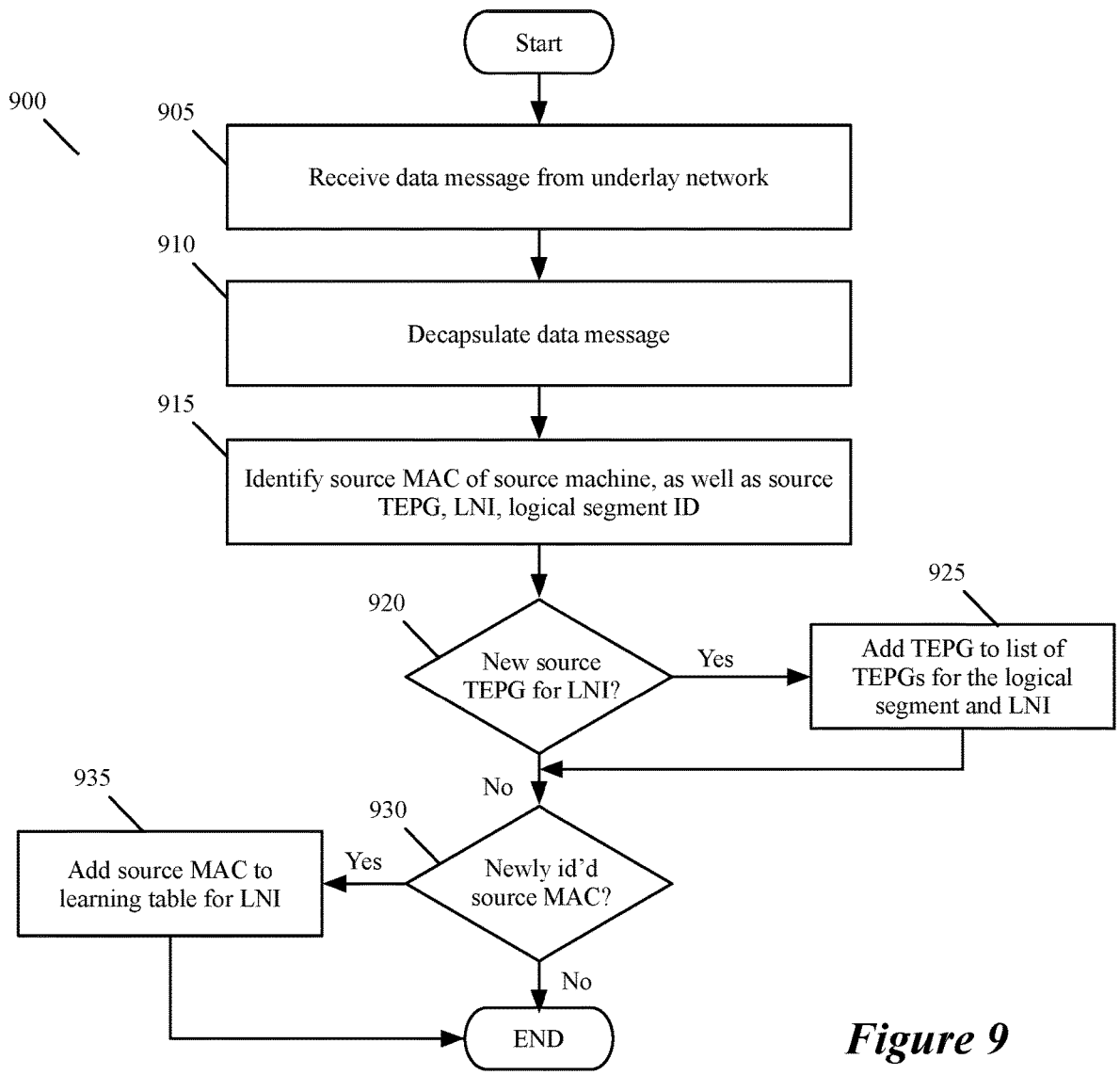
FIG. 9 conceptually illustrates a learning process that an overlay service performs on a host computer to learn a new TEPG and/or a new MAC address behind a TEPG.

FIG. 9 illustrates a learning process 900 that an overlay service (e.g., an encapsulator 450 or 452) performs on a host computer to learn a new TEPG and/or a new MAC address behind a TEPG. The process starts when the overlay service receives (at 905) a data message from the shared underlay physical network. In some embodiments, the received data message is passed to the overlay network by a port of a virtual switch executing on the computer, after the a PNIC on the computer passes the data message to the port.

The overlay module decapsulates (at 910) the data message by removing the encapsulating header, which is placed outside of the original header of the data message. From the removed encapsulating header and from the data message's original header, the overlay module next identifies (at 915) the source MAC address, as well as the source TEPG, a logical network identifier (LNI) and the logical segment identifier (ID). In some embodiments, the source MAC address is stored in the original header of the data message, while the source TEPG, the LNI and the logical segment ID are stored in the removed encapsulating header of the data message.

The LNI (also called VNI, for virtual network identifier) identifies a logical network, while the logical segment ID identifies the logical switch to which the source machine (e.g., a source VM associated with the source MAC address). This logical switch is implemented by (i.e., spans) multiple virtual switches, including the virtual switch associated with the overlay service that is performing the process 900 (i.e., the virtual switch executing on the same host computer as the overlay service) as well as the virtual switch of the host computer that executes the source machine.

At 920, the process determines whether it has a record for the identified source TEPG in a table that it has for the logical segment ID. This table is maintained because TEPGs are members of logical segments. The TEPGs are learned per logical segments (per logical switches) and are published through the control plane for each logical segment, as further described below. Each logical segment (each logical switch) is member of a logical network identified by the LNI.

When the process determines (at 920) that it does not have a record for the identified source TEPG in its table for the logical segment ID, the source TEPG is a newly learnt TEPG for the logical segment. Hence, the process transitions to 925, to add the source TEPG to a list of TEPGs that it maintains for the logical segment ID and the LNI, and then transitions to 930. The process also transitions to 930 when it determines (at 920) that it does have a record for the identified source TEPG in its table for the logical segment ID.

At 930, the process determines whether it has a record for the identified source MAC address being behind the source TEPG. If so, the overlay service has previously learnt this MAC address (i.e., previously created a record that associates the MAC address with the source TEPG, or received such a record through the control plane publication), and hence ends. Otherwise, the process transitions to 935, to add a record to a table that associates the MAC address with the source TEPG, and then ends. The table that associates the MAC addresses with the TEPGs are maintained per LNI. Associating the learnt MAC address tables with the LNIs allows two different VMs in two different logical networks to use the same MAC address in the two different logical MAC address spaces of the two logical networks.

Figure 10:
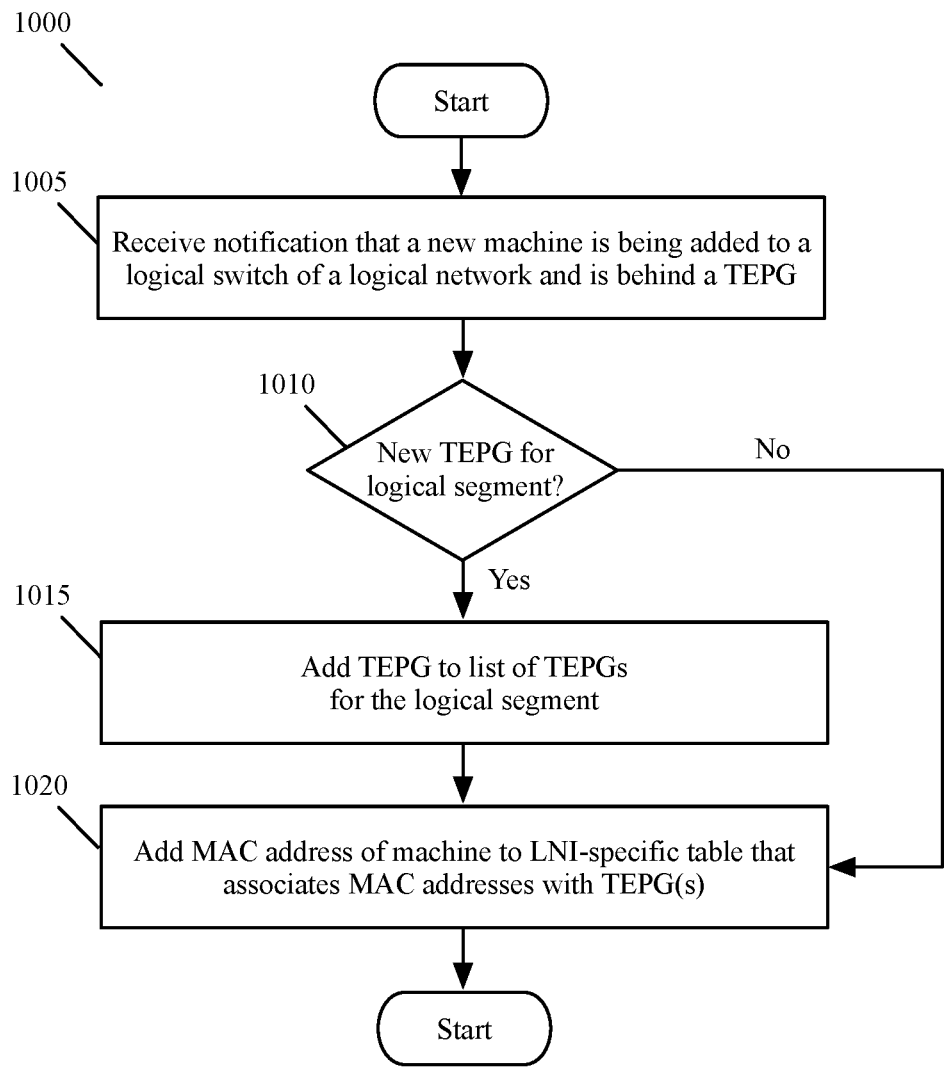
FIG. 10 conceptually illustrates a process that is performed on a particular host computer to learn TEPGs and MAC addresses behind TEPGs.

FIG. 10 illustrates a process 1000 that is performed on a particular host computer to learn TEPGs and MAC addresses behind TEPGs. Each host computer that uses TEPGs performs the process 1000 in some embodiments. Also, in some embodiments, the overlay service (e.g., encapsulators 450 and 452) on each host computer performs the process 1000. Also, in some embodiments, one TEPG and its TEPs can be associated with multiple logical networks. Hence, in these embodiments, the TEPGs are learned on a per LNI or logical segment.

As shown, the process 1000 starts (at 1005) when a notification is received that a new machine (e.g., a new VM) executing on the particular host computer is being connected to a particular logical switch of a logical network, and is associated with (i.e., is behind) a particular TEPG. When a machine is associated with a TEPG, the virtual switch on that host computer will use the set of one or more TEPs of the TEPG to send data messages of the machine and to receive data message for the machine.

Next, at 1010, the process 1000 determines whether the particular TEPG is one that has been previously been identified for use by another machine that executes on the particular host computer and that connects to the particular logical switch. If so, the process transitions to 1020, which will be described below. Otherwise, when the process determines (at 1010) that the particular TEPG has not been previously identified for another machine executing on the particular host computer and connected to the particular logical switch, the process adds (at 1015) the TEPG to a list of TEPGs that it maintains for the logical switch, and then transitions to 1020.

The TEPGs identified on this list are TEPGs identified by previous iterations of the process 1000 as well as TEPGs (1) that were identified on other host computers for the particular logical switch and (2) that have their identities published to the particular host computer through the control plane, as further described below. The TEP members of each TEPG are separately published through the control plane in some embodiments. The virtual switch on each host uses the TEPG members of a TEPG list for each logical switch to identify the TEPGs to which a broadcast or multi-cast message (such as an ARP (address resolution protocol) message or an ND (neighbor discovery) message) has to be published.

At 1020, the process 1000 adds the MAC address of the added new machine (e.g., the MAC address associated with this machines VNIC) to the LNI-specific table that associates MAC addresses of machines with TEPGs on the particular host computer and other host computers that execute other machines of the same logical network and hence have forwarding elements that implement logical forwarding elements (e.g., logical switches and routers) of the logical network. The LNI-specific table is associated with one logical network's LNI. On the particular host computer, the TEPG information is stored in the LNI-specific table of the logical network associated with the particular logical switch to which the new machine is connected because one TEPG of a host computer can be associated with multiple logical networks when the particular host computer executes machines of multiple logical networks. After 1020, the process 1000 ends.

Figure 11:
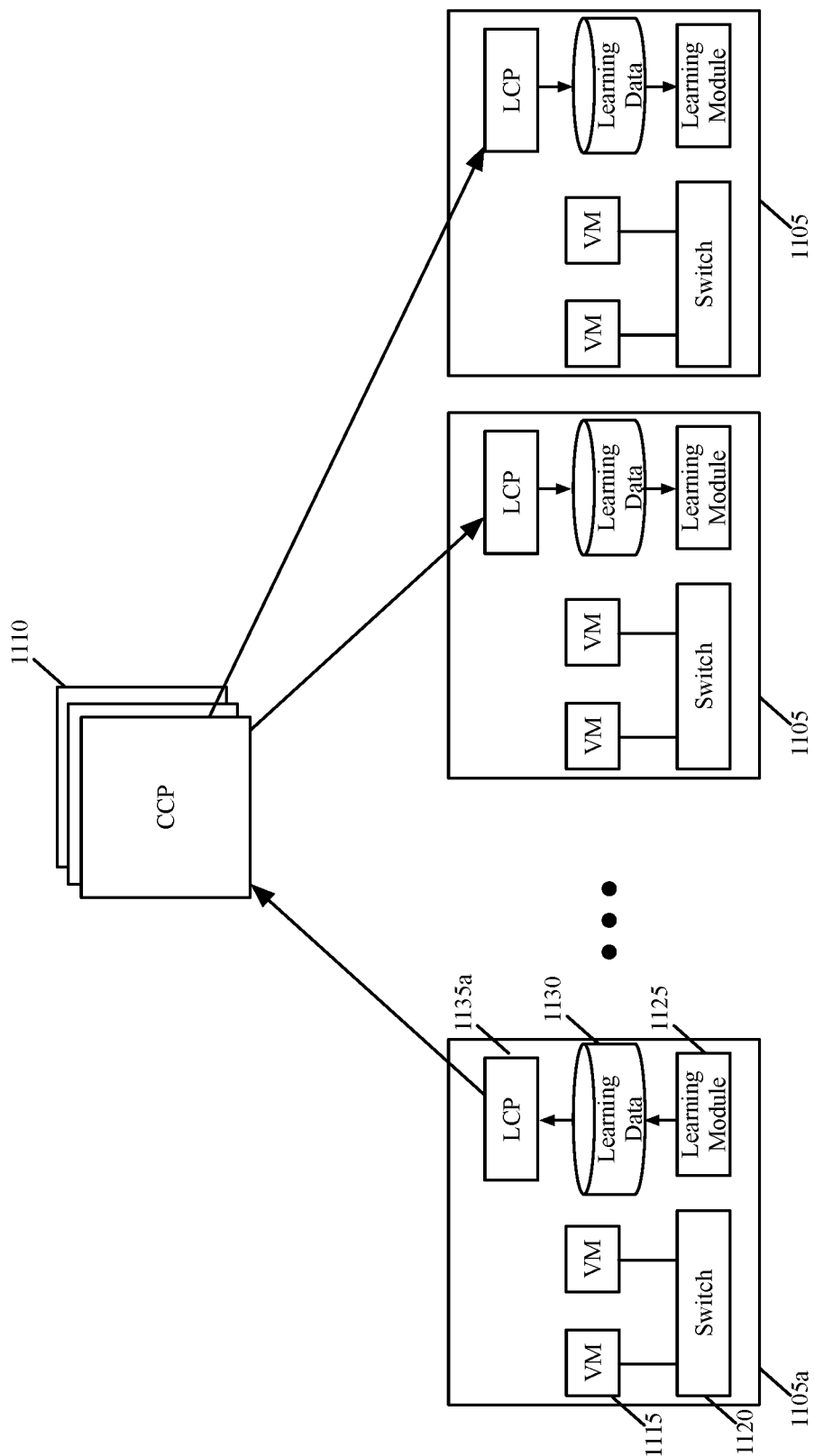
FIG. 11 conceptually illustrates control plane components of a software managed datacenter (SDDC).

FIG. 11 illustrates control plane components of a software managed datacenter (SDDC). As shown, the SDDC includes several host computers 1105 and a controller cluster 1110. Each host computer has several VMs 1115 executing on it along with a software switch 1120, a MAC learning module 1125, a learning data store 1130 and a local control plane 1135.

In some embodiments, the MAC learning module 1125 is or includes the overlay service (e.g., the encapsulator 450 or 452) of a hypervisor executing on the host computer. When performing the process 900 of FIG. 9, the learning module 1125 learns through processing data messages received on the datapath (1) the TEPGs for each logical segment (e.g., each logical switch implemented by several software switches 1120), and (2) the MAC address of a VM operating behind a TEPG. The learning module 1125 stores the learned TEPG data and MAC address data in its learning date store 1130.

When a new first VM is associated with a logical switch implemented by its associated software switch 1120, the learning module 1125 performs the process 1000 of FIG. 10, and learns the TEPG(s) (of its host computer) used for sending the data messages of the logical switch and this new VM's MAC address association with the learned TEPG(s). Again, the learning module 1125 stores the learned TEPG and MAC-address data in its learning date store 1130.

On each host, the LCP 1135 publishes to the CCP 1110 the newly learned TEPG and MAC address data in the learning data store 1130, either periodically and/or each time a new set of one or more learned records is created in the learning data store 1130. The CCP then distributes (i.e., publishes) to the other LCP modules 1135, on host computers, the data received from any one LCP module on any one host computer.

In some embodiments, the CCP 1110 publishes this data either periodically and/or each time it receives a new set of one or more learned records from an LCP of a host computer. The CCP 1110 in some embodiments bundles learned data from two or more LCPs when the learned data falls within one reporting time period, and reports all the bundled learned data together. In the example illustrated in FIG. 11, the LCP 1135*a* of the host computer 1105*a* is shown publishing its learned data to the CCP 1110, which then pushes the learned data to the LCPs of the other host computers. The LCPs of the other host computers then store the learned TEPG and/or MAC address data in their respective learned data stores 1130.

Some embodiments implement the above-described approach with a novel control plane configuration command. In previous systems that did not use TEPGs, when a first workload VM on a host computer is attached to a logical switch (LS) that is implemented by several virtual switches, the control plane reports the corresponding local TEP to have joined the span of that logical switch to a cluster of central controllers. To send such a report, the control plane uses the following message format <JOIN, LS X, TEP IP Y, TEP MAC Z>, which specifies that the VM has joined a particular logical switch X at a TEP with an IP address Y and a MAC address Z.

The controller then disseminates this information to other host computers, which have at-least one workload VM on that logical switch X. The segment span is maintained at each host so that BUM (Broadcast, Unknown Unicast, Multicast) traffic can be replicated to each of the TEPs in the logical switch span. This approach results in a large number of control plane messages during the VM Life Cycle Management (LCM). For example, every time the first workload VM is associated with a new TEP, the control plane reports that TEP has joined the span. Such an approach results in reporting <JOIN, LS, TEP1 IP, TEP1 MAC>, <JOIN, LS, TEP IP2, TEP2 MAC> . . . <JOIN, LS, TEP IPn, TEPn MAC> when VMs are associated with all the TEPs. Similarly, when the last workload VM associated with a TEP is detached, shutdown, or moved to another host computer, the control plane reports this state as well.

To reduce the large number of such messages, the above-described control plane approach of FIGS. 9-11 publishes one record during system power up to report to the central controller cluster <TEP Group ID, [<Member TEP IP 1, MAC 1> . . . <Member TEP IPn, MACn>]> with n being the number of TEPs in the TEP group. Hence, at system power up (e.g., host computer power up), some embodiments report each TEPG on the host along with each TEP member of each TEPG, with the TEP members identified in terms of their TEP IP and MAC addresses.

For any VM that is powered up, these embodiments report the VM's identifier (e.g., the VM's MAC address) along with a join message, e.g., in a format <JOIN, LS X, TEP-Group ID>, that indicates that the VM has joined a particular logical segment and is operating behind a particular TEPG. These join messages are at 1/n frequency, where "n" is the number of members in the TEP-Group, meaning these messages are not sent for each TEP member of the TEPG but are just sent for the TEPG. Also, on a host computer, for the first VM that joins a segment of a logical network implemented by a virtual switch executing on the host computer, some embodiments associate the logical segment with a TEPG of the host computer and report the association of the logical segment (as identified by the LS ID) and the TEPG (as identified by a TEP-Group ID).

For other VM LCM operations, such as detached, shutdown, or moved, some embodiments use similar messages with formats, such as <Leave, LS X, TEP-Group ID>, that are similar to the format described above for a VM's joining of a logical segment and a TEPG. The central controller disseminates all the information published by one host computer to other host computers, which have at-least one workload VM on the same logical switch X. The segment span is maintained at each host so that BUM (Broadcast, Unknown Unicast, Multicast) traffic can be replicated to each of the TEPGs in the logical switch span.

The above-described approach alleviates a lot of compute and network load on the central controller cluster as it reduces the VM LCM messages associated with TEPs and TEPGs. This, in turn, improves the scalability of the controller cluster. More generally, the above-described approach, has several benefits. It has similar throughput gains to that of LAG with no dependency on underlay LAG configuration/protocols like LACP/M-LAG etc.

Figure 12:
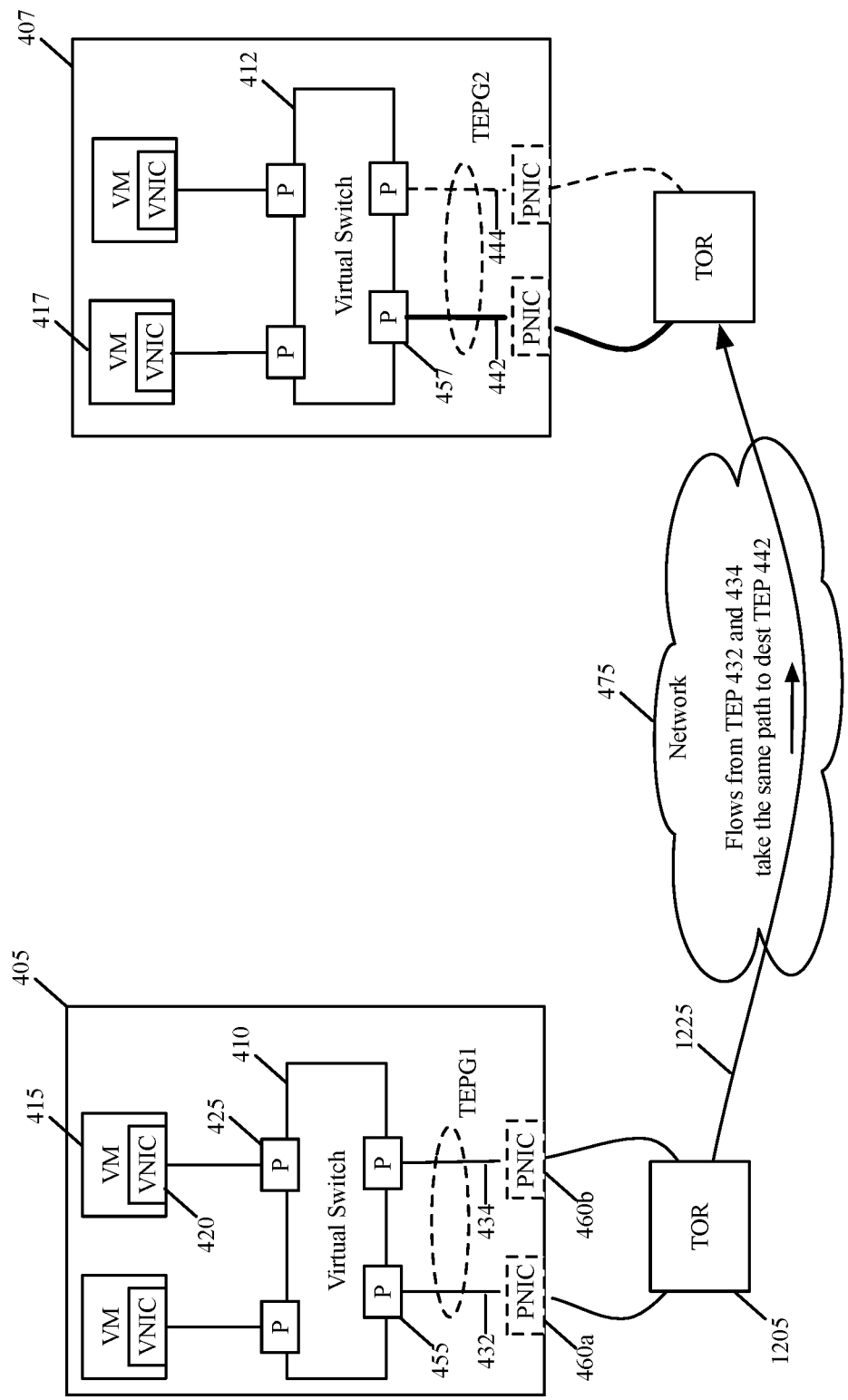
FIG. 12 conceptually illustrates how TEPs of a TEPG are assigned to one subnet in some embodiments by reference to FIG. 4.

The above-described TEPG architecture also supports TEPs in different L3 subnets, and provides finer grained load-balancing than existing multi-TEP solutions, with reduced control plane messaging. To illustrate TEPs assigned to different L3 subnets, FIG. 12 first illustrates how TEPs of a TEPG are assigned to one subnet in some embodiments. Specifically, for the example described above by reference to FIG. 4, FIG. 12 illustrates the two PNICs 460*a* and 460*b* associated with the two TEPs 432 and 434 of the host computer 405 connecting to one top-of-rack (TOR) switch 1205. The two TEPs 432 and 434 form a virtual LAG. Alternatively expressed, the TEPG1 (that includes the TEPs 432 and 434) is a virtual LAG.

The TOR 1205 is part of one physical L2 segment of the underlay network. Hence, both the PNICs (and their associated TEPs 432 and 434) are assigned two IP addresses in the same subnet. This means that data messages sent from the host computer 405 to the same destination TEP 442 of the host computer 407 through either of the two TEPs 432 and 434 (and their associated PNICs) will take the same path 1225 through the intervening network 475. This is because the destination IP address of the destination TEP 442 is the same for packets from TEP 432 and 434 to the destination TEP 442, and hence the next hop lookup of the TOR will be the same for both source TEPs 432 and 434.

Figure 13:
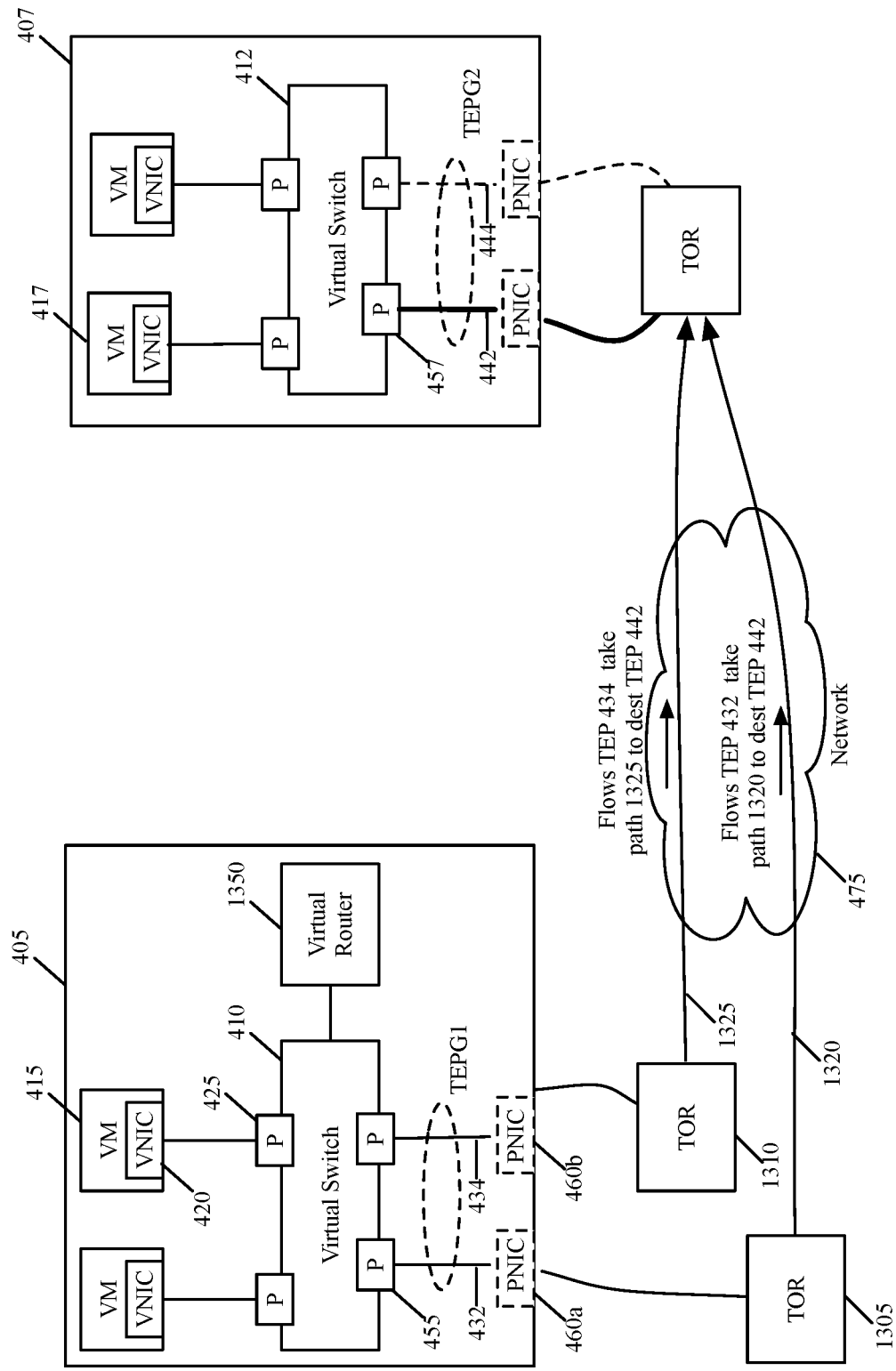
FIG. 13 conceptually illustrates two different TEPs of a TEPG assigned to two different subnets in some embodiments by reference to FIG. 4.

FIG. 13 illustrates two different TEPs of a TEPG assigned to two different subnets in some embodiments. Specifically, for the example described above by reference to FIG. 4, FIG. 12 illustrates the two PNICs 460a and 460b associated with the two TEPs 432 and 434 of the host computer 405 connecting to two different TORs 1305 and 1310. These two TORs are parts of two different physical L2 segment of the underlay network. Hence, the PNICs 460a and 460b (and their associated TEPs 432 and 434) are assigned two IP addresses in two different subnets.

This means that data messages sent from the host computer 405 to the same destination TEP 442 of the host computer 407 through the two TEPs 432 and 434 (and their associated PNICs) will take two different paths 1320 and 1325 through the intervening network 475. This is because the two TORs 1305 and 1310 are part of two different L3 subnets, and hence will have different sets of paths to the destination IP address of the destination TEP 442.

In some embodiments, the virtual switch 410 or a virtual router 1350 executing on the host computer 405 will perform a multi-path process (e.g., equal cost multipathing, ECMP) to select between the two TEPs 432 or 434 for data message flows being sent from a source VM on the computer 405 to a destination VM on the computer 407. For each such data message flow, the virtual switch or the virtual router in some embodiments first identifies the source and destination TEPGs behind which the source and destination VMs on computers 405 and 407 reside, and then performs the multi-path operation to select one source TEP from the identified source TEPG and one destination TEP from the identified destination TEPG for the flow. The selected source TEP then determines which PNIC and TOR will then receive the data messages of the flow, and this in turn results in the flow taking the path to the destination computer 407 that was selected by the virtual switch or router.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 14:
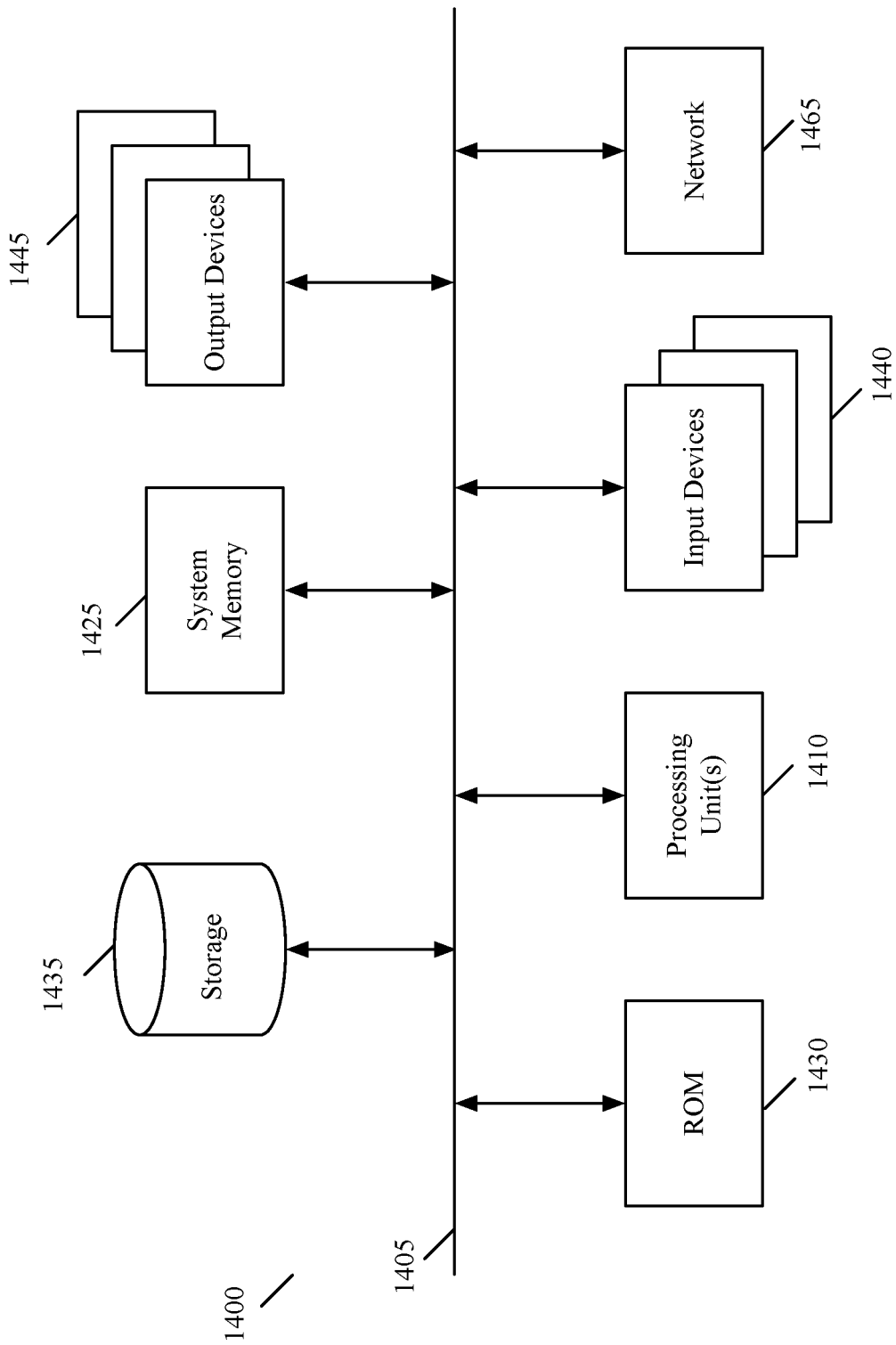
FIG. 14 conceptually illustrates a computer system with which some embodiments of the invention are implemented

FIG. 14 conceptually illustrates a computer system 1400 with which some embodiments of the invention are implemented. The computer system 1400 can be used to implement any of the above-described computers and servers. As such, it can be used to execute any of the above described processes. This computer system includes various types of non-transitory machine readable media and interfaces for various other types of machine readable media. Computer system 1400 includes a bus 1405, processing unit(s) 1410, a system memory 1425, a read-only memory 1430, a permanent storage device 1435, input devices 1440, and output devices 1445.

The bus 1405 collectively represents all system, peripheral, and chipset buses that communicatively connect the numerous internal devices of the computer system 1400. For instance, the bus 1405 communicatively connects the processing unit(s) 1410 with the read-only memory 1430, the system memory 1425, and the permanent storage device 1435.

From these various memory units, the processing unit(s) 1410 retrieve instructions to execute and data to process in order to execute the processes of the invention. The processing unit(s) may be a single processor or a multi-core processor in different embodiments. The read-only-memory (ROM) 1430 stores static data and instructions that are needed by the processing unit(s) 1410 and other modules of the computer system. The permanent storage device 1435, on the other hand, is a read-and-write memory device. This device is a non-volatile memory unit that stores instructions and data even when the computer system 1400 is off. Some embodiments of the invention use a mass-storage device (such as a magnetic or optical disk and its corresponding disk drive) as the permanent storage device 1435.

Other embodiments use a removable storage device (such as a flash drive, etc.) as the permanent storage device. Like the permanent storage device 1435, the system memory 1425 is a read-and-write memory device. However, unlike storage device 1435, the system memory is a volatile read-and-write memory, such a random access memory. The system memory stores some of the instructions and data that the processor needs at runtime. In some embodiments, the invention's processes are stored in the system memory 1425, the permanent storage device 1435, and/or the read-only memory 1430. From these various memory units, the processing unit(s) 1410 retrieve instructions to execute and data to process in order to execute the processes of some embodiments.

The bus 1405 also connects to the input and output devices 1440 and 1445. The input devices enable the user to communicate information and select commands to the computer system. The input devices 1440 include alphanumeric keyboards and pointing devices (also called "cursor control devices"). The output devices 1445 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 14, bus 1405 also couples computer system 1400 to a network 1465 through a network adapter (not shown). In this manner, the computer can be a part of a network of computers (such as a local area network ("LAN"), a wide area network ("WAN"), or an Intranet, or a network of networks, such as the Internet. Any or all components of computer system 1400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, and any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, while several examples were provided above by reference to VMs and hypervisors, one of ordinary skill will realize that other embodiments use other types of machines (such as Pods or containers) as sources and destination machines for data message flows. Thus, one of ordinary skill in the art would understand that the invention is not to be limited by the foregoing illustrative details, but rather is to be defined by the appended claims.

The invention claimed is:

1. A method of forwarding data messages between source and destination host computers that execute source and destination machines, the method comprising:
   at the source host computer on which the source machine for a particular data message flow executes:
      identifying a source tunnel endpoint group (TEPG) associated with the source machine, the source TEPG comprising a plurality of tunnel endpoints (TEPs) on a plurality of different layer 3 subnets;
      performing a multi-pathing operation to select for the particular data message flow one TEP associated with one path from a plurality of paths between the source and destination host computers, each path using a different source TEP with a different L3 subnet; and
      using the selected source TEP to forward the particular data message flow to the destination host computer on which the destination machine executes.

2. The method of claim 1, wherein two different source TEPs are connected to two different switches that are part of two different L3 subnets.

3. The method of claim 2, wherein the two switches are top-of-rack switches.

4. The method of claim 2, wherein the two source TEPs include a first source TEP associated with a first physical network interface controller (PNIC) of the source host computer and a second source TEP associated with a second PNIC of the source host computer, each PNIC connected to a different switch.

5. The method of claim 4, wherein each TEP is associated with an uplink port of a virtual switch executing on the source host computer.

6. The method of claim 2 further comprising using different selected source TEPs connected to different switches to send encapsulated data messages of different flows along different paths to the destination host computer, each path commencing at a different switch, wherein each encapsulated data message is encapsulated with a tunnel header that specifies a network address of a selected source TEP.

7. The method of claim 6 further comprising
   identifying, at the source host computer, a destination TEPG associated with the destination machine;
   selecting one TEP from the destination TEPG for the particular data message flow; and
   storing in the tunnel header used for the particular data message flow the network addresses of the selected source and destination TEPs for the particular data message flow.

8. The method of claim 7 comprising further storing in the tunnel header identifiers for the selected source and destination TEPGs.

9. The method of claim 7 comprising further storing in the tunnel header identifiers for the selected source and destination TEPs.

10. The method of claim 7, wherein the particular data message flow is for an overlay logical network and the TEPs and switches are part of an underlay network over which the overlay logical network is defined.

11. A non-transitory machine readable medium storing a program for forwarding data messages between source and destination host computers that execute source and destination machines, the program for execution on the source host computer, the source program comprising sets of instructions for:
   identifying, for a particular data message flow from the source machine, a source tunnel endpoint group (TEPG) associated with the source machine, the source TEPG comprising a plurality of tunnel endpoints (TEPs) on a plurality of different layer 3 subnets;
   performing a multi-pathing operation to select for the particular data message flow one TEP associated with one path from a plurality of paths between the source and destination host computers, each path using a different source TEP with a different L3 subnet; and using the selected source TEP to forward the particular data message flow to the destination host computer on which the destination machine executes.

12. The non-transitory machine readable medium of claim 11, wherein two different source TEPs are connected to two different switches that are part of two different L3 subnets.

13. The non-transitory machine readable medium of claim 12, wherein the two switches are top-of-rack switches.

14. The non-transitory machine readable medium of claim 12, wherein the two source TEPs include a first source TEP associated with a first physical network interface controller (PNIC) of the source host computer and a second source TEP associated with a second PNIC of the source host computer, each PNIC connected to a different switch.

15. The non-transitory machine readable medium of claim 14, wherein each TEP is associated with an uplink port of a virtual switch executing on the source host computer.

16. The non-transitory machine readable medium of claim 12, wherein the program further comprises a set of instructions for using different selected source TEPs connected to different switches to send encapsulated data messages of different flows along different paths to the destination host computer, each path commencing at a different switch, wherein each encapsulated data message is encapsulated with a tunnel header that specifies a network address of a selected source TEP.

17. The non-transitory machine readable medium of claim 16, wherein the program further comprises sets of instructions for:
    identifying, at the source host computer, a destination TEPG associated with the destination machine;
    selecting one TEP from the destination TEPG for the particular data message flow; and
    storing in the tunnel header used for the particular data message flow the network addresses of the selected source and destination TEPs for the particular data message flow.

18. The non-transitory machine readable medium of claim 17, wherein the program further comprises a set of instructions for storing in the tunnel header identifiers for the selected source and destination TEPGs.

19. The non-transitory machine readable medium of claim 17, wherein the program further comprises a set of instructions for storing in the tunnel header identifiers for the selected source and destination TEPs.

\* \* \* \* \*